United States Patent [19]

Hardigg et al.

[11] 4,352,977
[45] Oct. 5, 1982

[54] WELDING APPARATUS AND METHOD

[75] Inventors: James S. Hardigg; Joseph C. Strzegowski, Jr., both of Conway; Asial L. Burgess, Jr., Ludlow; David B. Neal, Northampton, all of Mass.

[73] Assignee: Hardigg Industries, Inc., South Deerfield, Mass.

[21] Appl. No.: 119,972

[22] Filed: Feb. 8, 1980

[51] Int. Cl.³ .......................................... B65B 51/10
[52] U.S. Cl. ..................................... 219/243; 53/373
[58] Field of Search ...................... 219/243, 201, 86.7; 53/373, 375, 379

[56] References Cited

U.S. PATENT DOCUMENTS 3,897,296  7/1975  Waldrum .......................... 219/243
4,282,699  8/1981  Embro, Jr. ........................ 219/243

Primary Examiner—C. C. Shaw
Attorney, Agent, or Firm—Cushman, Darby & Cushman

[57] ABSTRACT

A device and method for welding battery jar covers onto battery jars with the battery elements and terminal post in position within the jar and with a cover placed in position. The invention includes an exemplary welding apparatus that employs separate heating and clamping mechanisms on each side of the jar so that the cover does not have to be lifted completely off the jar during welding and this structure greatly reduces the time required to change over from one size to another thereby increasing the per unit processing capacity of the device. Further, in order that a variety of jar sizes be rapidly handled, two of the heating and clamping mechanisms are relatively long while the other two or relatively short and equal to the constant width dimension of batteries. The invention accomplishes the loading operation automatically and by not removing the cover fully from the jar better and more accurate welds are produced.

30 Claims, 22 Drawing Figures

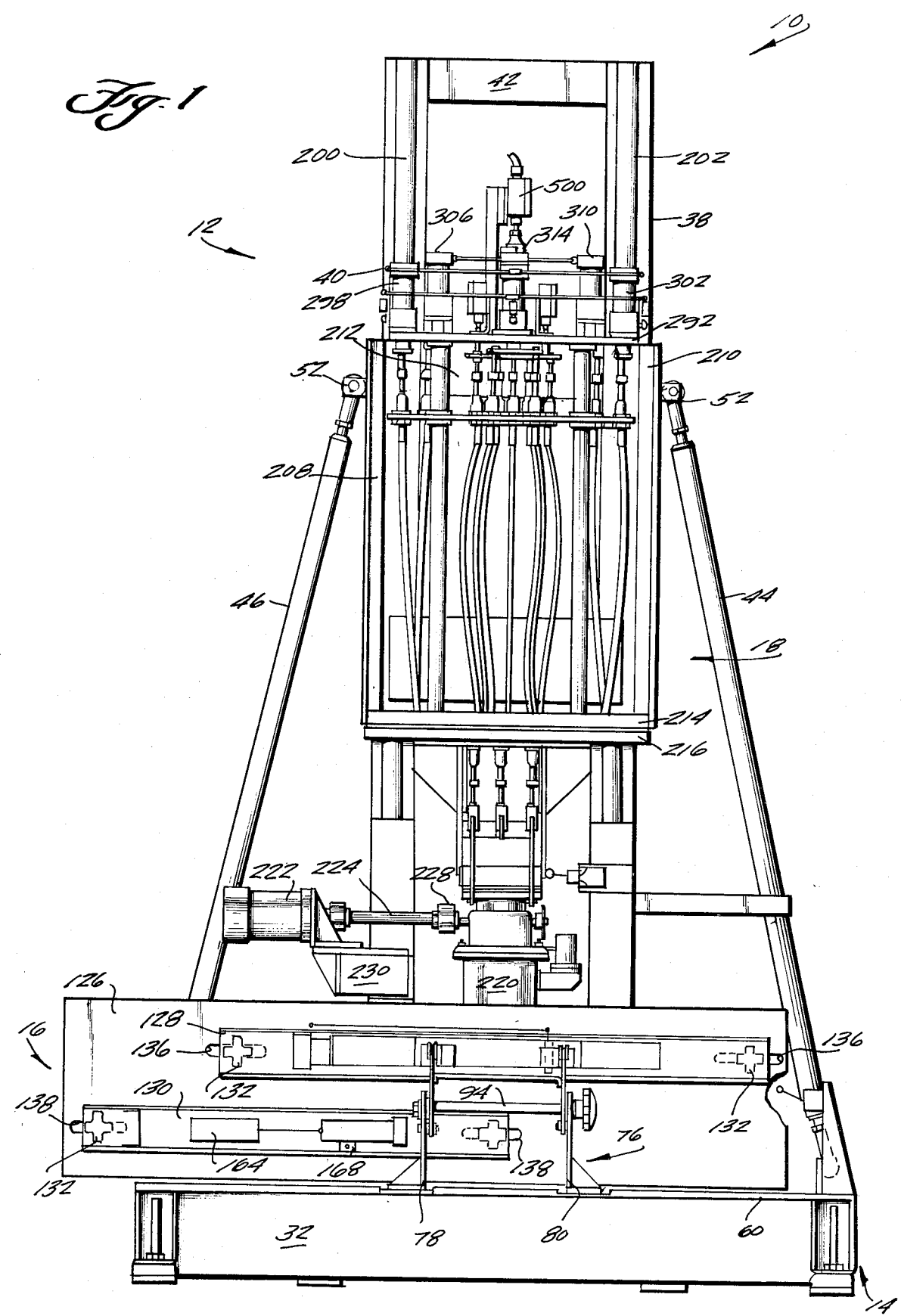

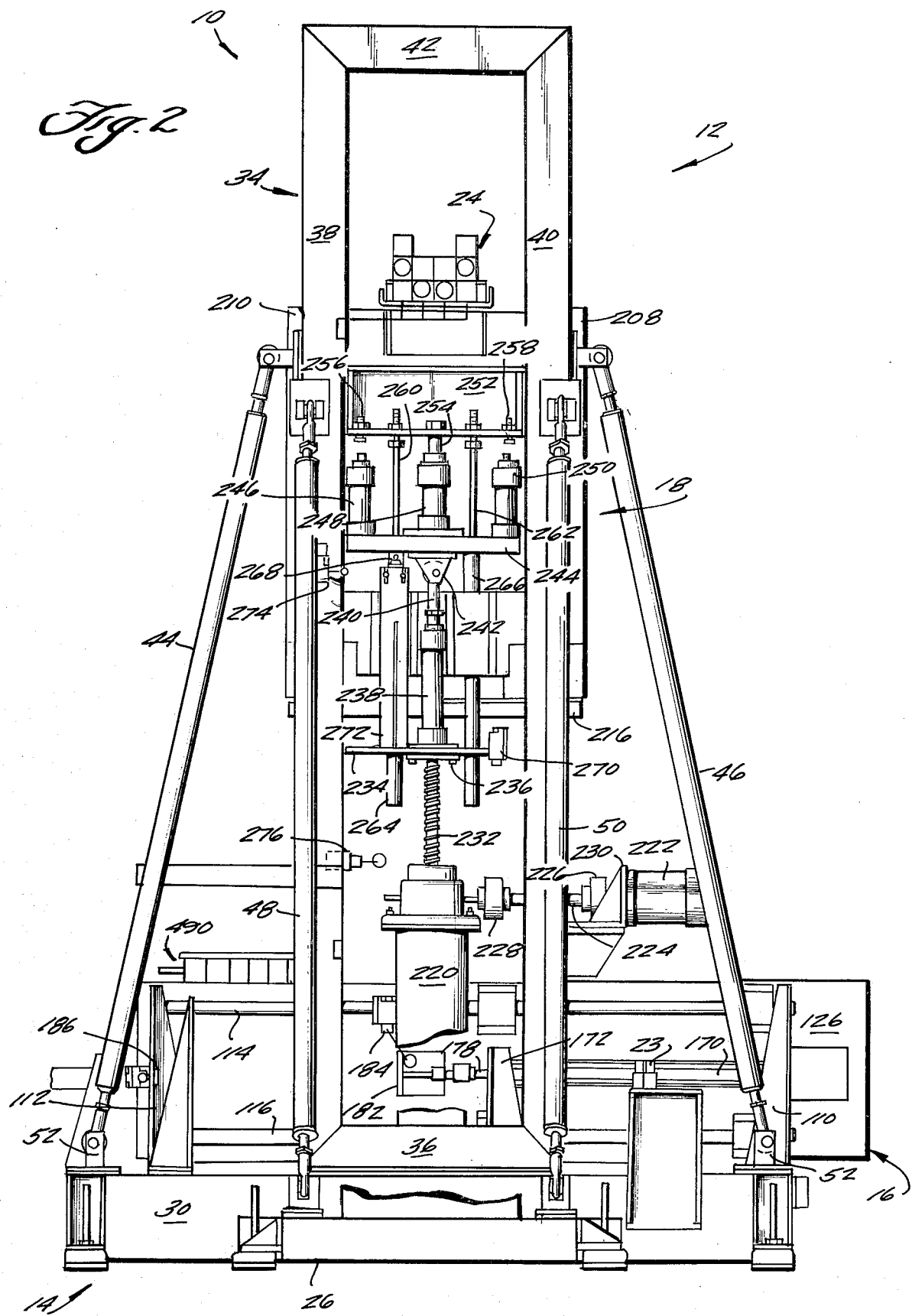

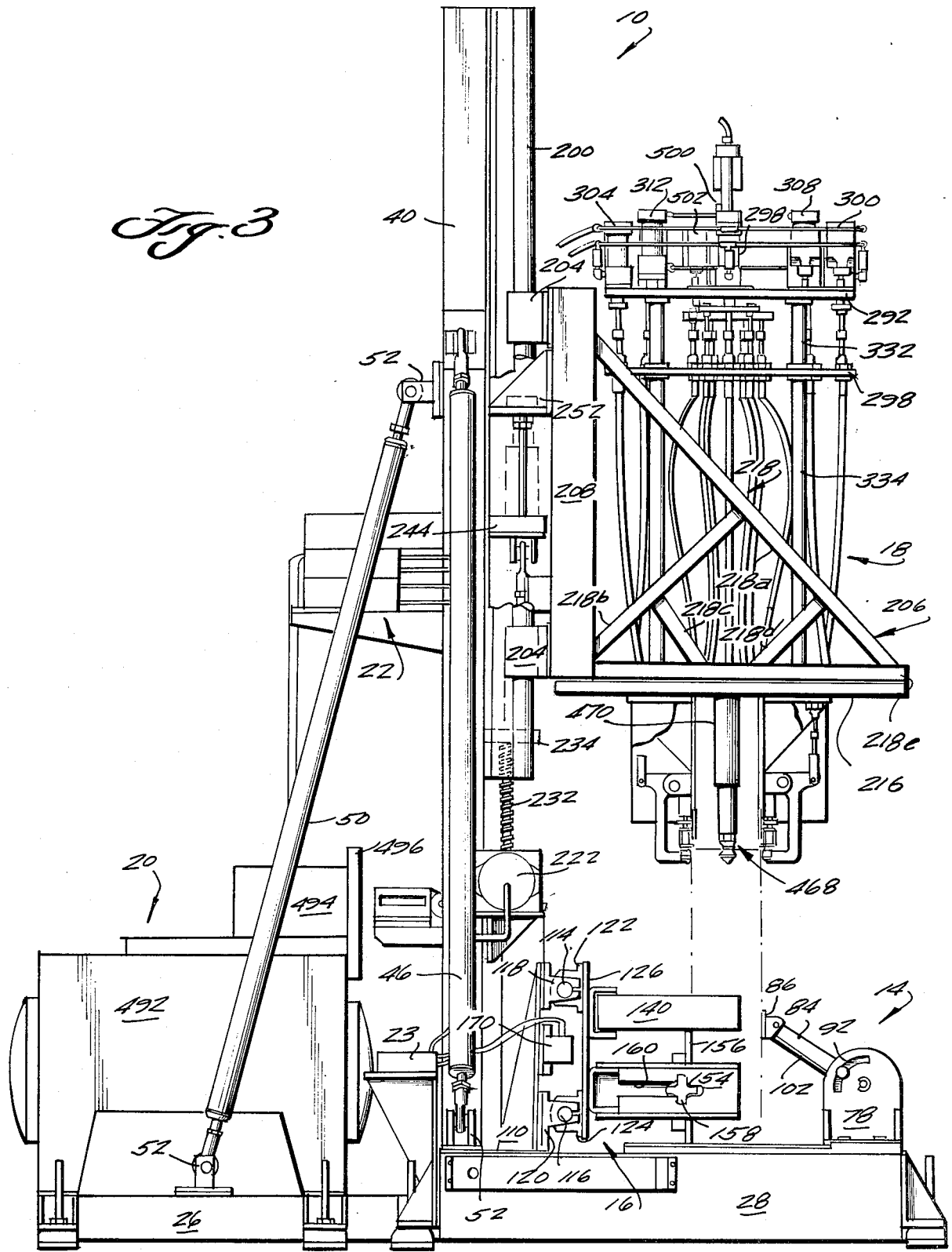

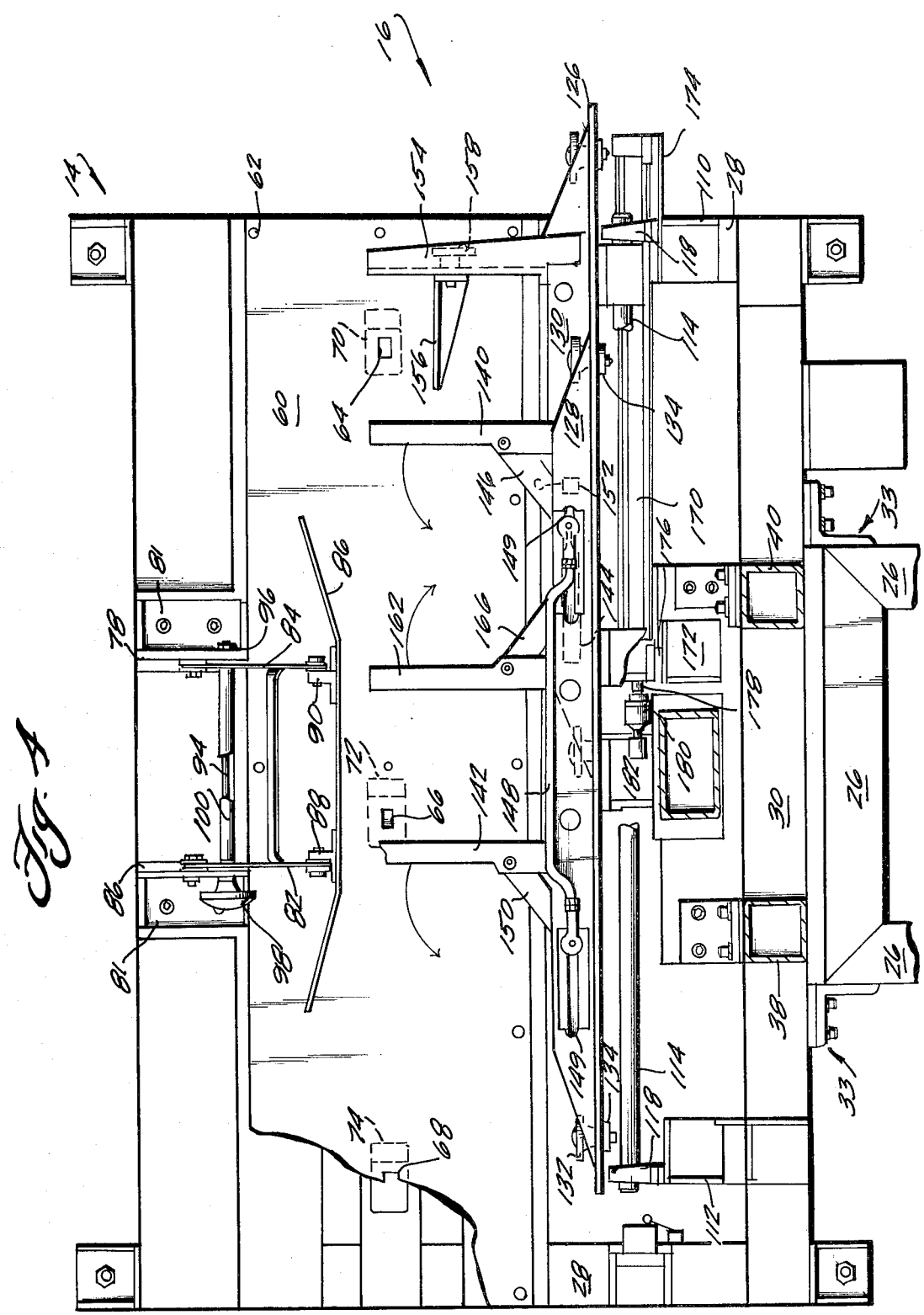

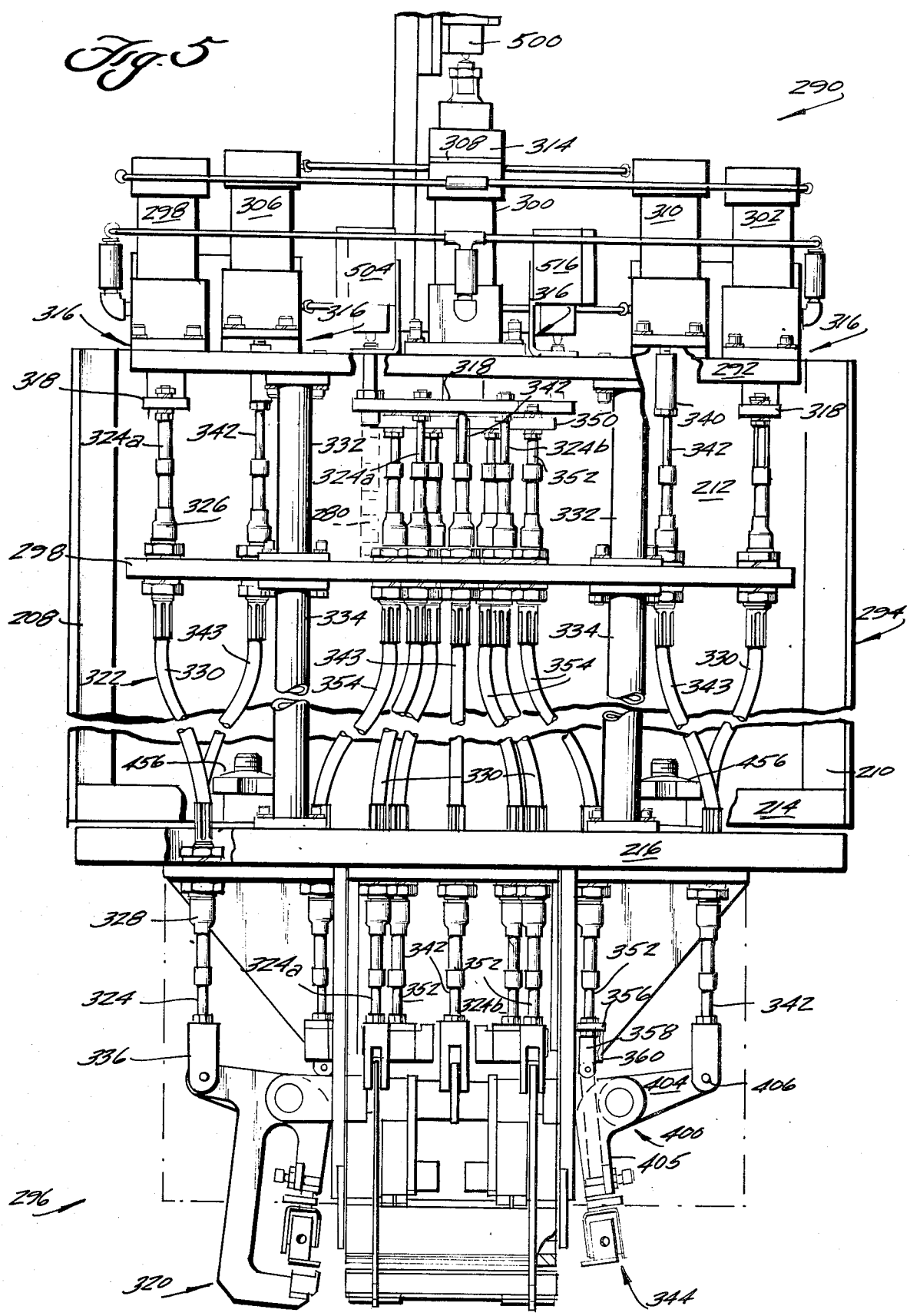

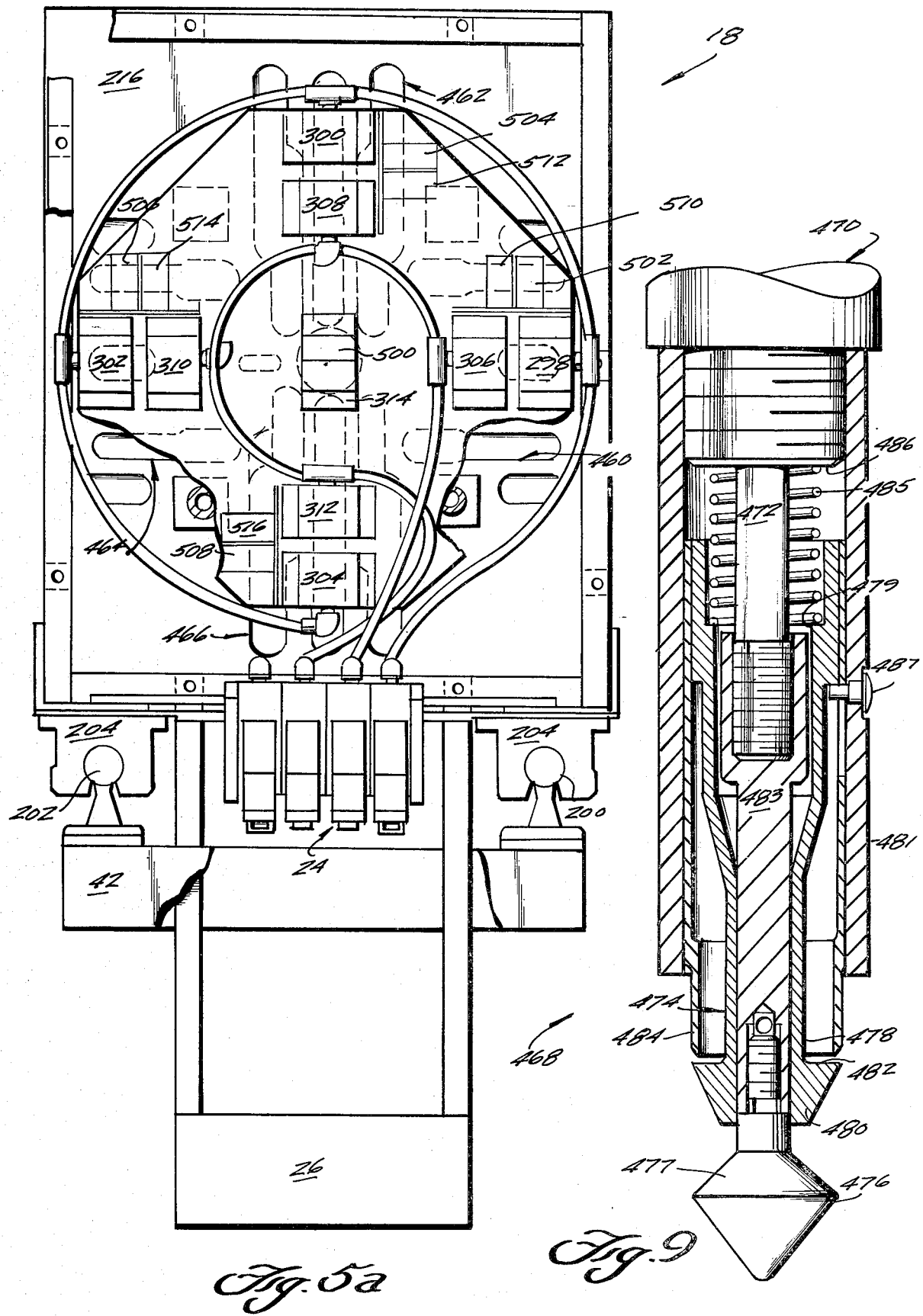

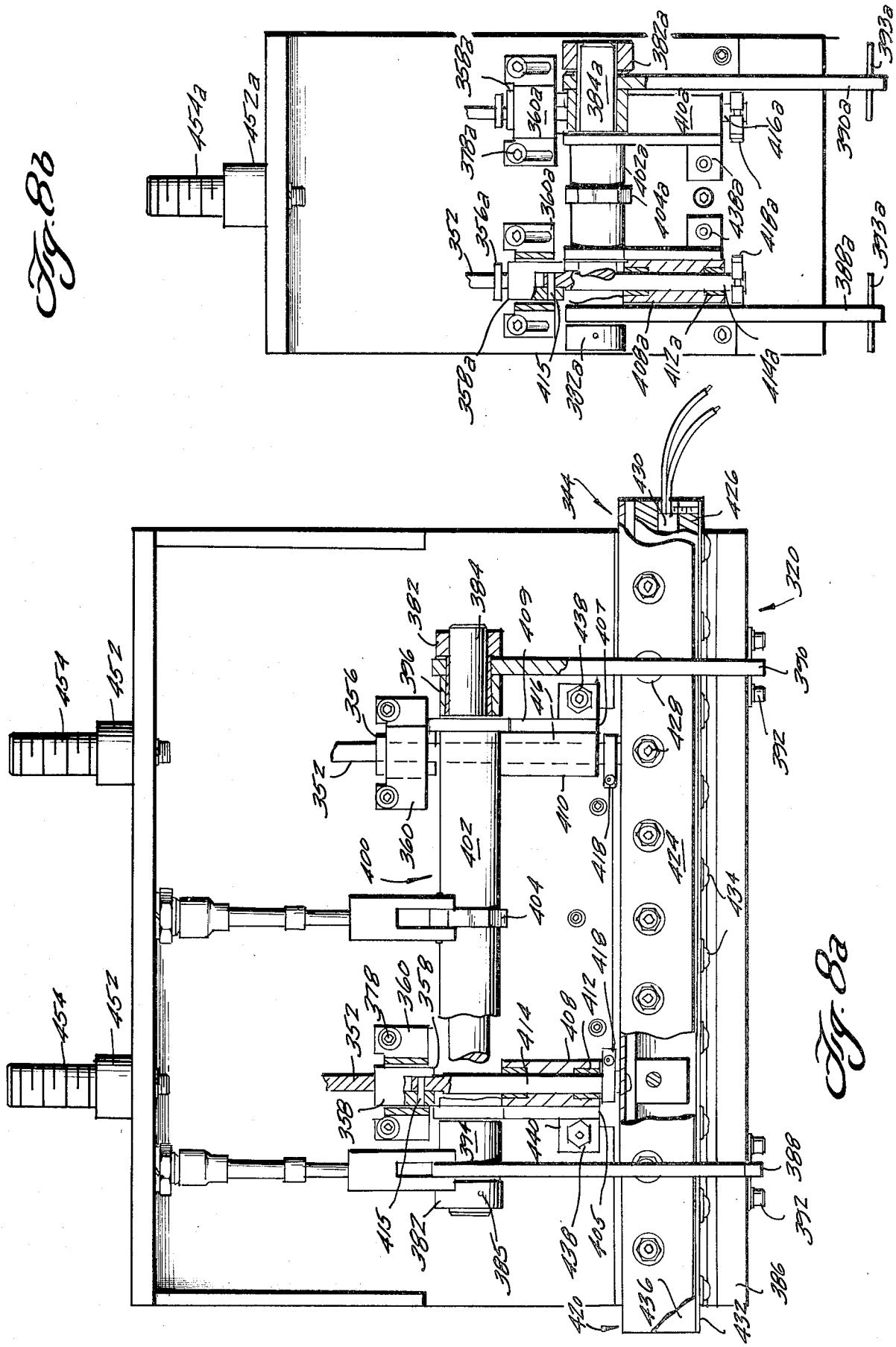

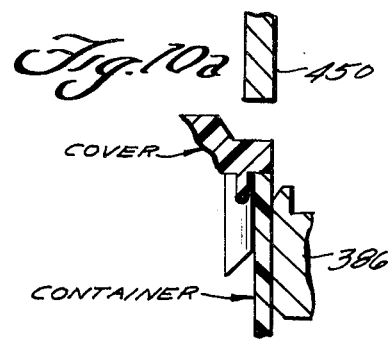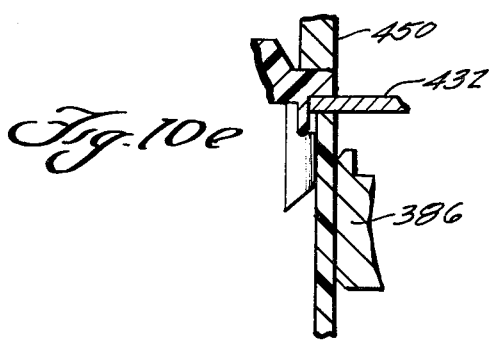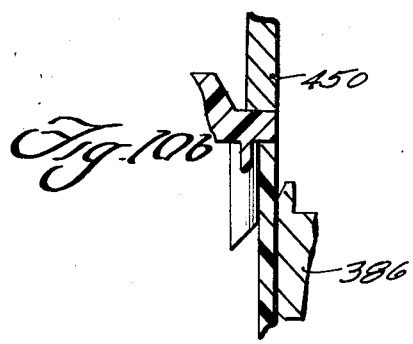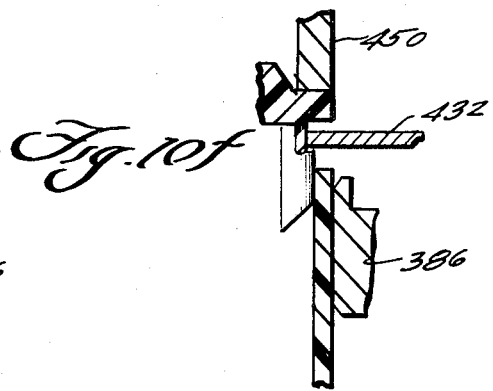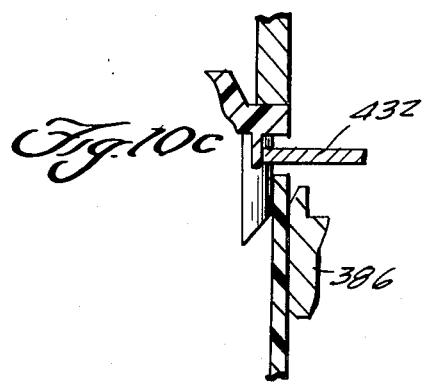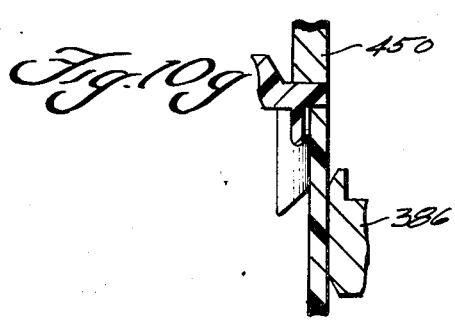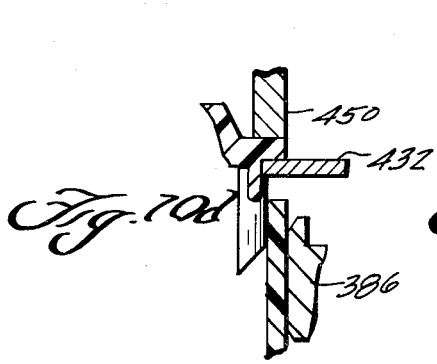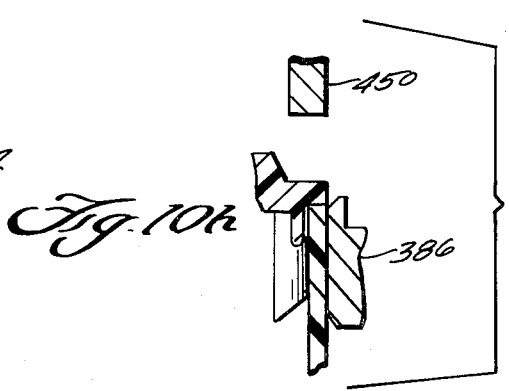

WELDING APPARATUS AND METHOD

BACKGROUND OF THE PRESENT INVENTION

Devices are known which are used to weld battery covers onto battery cases or jars. Such devices have, in the past, solved the problem of how to weld around terminal posts which extend upwardly beyond the plane established by the rim of the battery jar by employing one piece heating elements shaped to be equal to the size of the periphery of the jar rim a particular jar on which a cover is being welded. Such heating elements have either had a hollow interior or were provided with properly positioned holes through which the terminal posts could extend. Such heating elements were usually fed horizontally from alongside the welding area after the cover had been lifted completely off of the battery jar and out of engagement with the terminal posts. Following the insertion of the one piece heating platen from the side the platen and the cover would again be lowered over the terminal posts and back onto the jar with the platen now occupying a position between the upper edge of the jar and the bottom of the cover. Following heating, the battery cover would again be lifted completely off and away from the battery jar and the terminal posts so that the heating platen could be raised away from the jar and above the tops of the terminal posts after which it could be withdrawn horizontally with the cover being lowered thereafter into place so that the welding process could be completed.

The complete removal of the battery cover from the battery jar and its subsequent travel back and forth during heating and welding to allow for the insertion and removal of the heating platen complicates the welding process in a number of ways not the least of which is that when the cover is removed the initial alignment provided by having the cover in the jar is lost and additional alignment problems can result. It should be kept in mind that as the sidewall thickness of battery jars decreases there is a tendency for such sidewalls to flex inwardly or outwardly and, accordingly, at least to some extent, the cover helps stabilize and shape the sidewalls of the battery jar. When the cover is completely removed, it is possible for the sidewalls of the battery jar to become distorted so that during the heating process when the cover is not continuously in the jar, both the jar and the cover may be irregularly melted.

In addition, it is known that an oxidized surface can be formed on melted thermoplastic or plastic materials when exposed to air. Likewise, the heating of the plastic to its fusion temperature also tends to degrade the plastic adjacent the heating platen. Thus, the longer the melted surfaces remain exposed to the atmosphere the greater the problems associated therewith. Further, to produce clean and strong joints between the melted areas it is important to have clean nondegraded melted material within the joint. Accordingly, by raising the cover and waiting while the platen is removed and moving the cover back into the jar, even assuming acceptable alignment is again obtained, the relatively long period of time that both the jar and cover have to remain exposed increases the inevitability of having weld failures result due to the relatively long exposure times.

Also, since the platens were one piece elements, each could be shaped or sized for one or a small grouping of battery sizes. While there are two relatively standard width sizes for battery jars there are a wide variety of lengths used in industry. Accordingly, each change from one size or one group to another required such machines to be out of service for relatively long periods while the platens were exchanged and the machine recalibrated.

Accordingly, one of the primary objective of the present invention is to provide a device which will allow the welding of battery covers onto battery jars in a way that does not require the cover to be completely removed from the jar during the welding operation. An additional objective is the development of a welding device that allows the processing of a wide number of jar sizes, both with respect to the height of the jar and their length and width dimensions, by making it a relatively simple matter to change from one set of jar parameters to another in a short time.

SUMMARY OF THE PREFERRED EXEMPLARY EMBODIMENT OF THE PRESENT INVENTION

The preferred exemplary embodiment of the present invention is supported by a main frame and is comprised of a deck area along which battery jars with their covers in place can be moved from a load station to weld and unload stations by a transfer carriage mechanism in a sequential manner. Positioned directly above the weld station is a vertically movable welding head. There is an initial adjustment that can be made to properly position the welding head for the height of jars to be processed and the welding head itself is initially raised or lowered to a correct welding height. Independent of that vertical adjustment, the welding head is under the control of two other raising and lowering drive systems. One moves the welding head to allow sufficient clearance for jars to be moved along the deck area beneath the weld head between welding cycles. During welding, the weld head itself is movable between a series of secondary raised and lowered positions to allow for insertion of separated heating bars as will be more fully described hereafter.

The weld head itself is comprised of a primary horizontal mounting plate on which four separate vertically oriented mounting plates are secured so that they can be moved toward and away from the central portion of that primary mounting plate. Two of those vertically oriented mounting plates are relatively long and of an equal length whereas the other two mounting plates are relatively short and are equal to the width dimension of the jars. Thus, the pair of short plates fit between the two longer mounting plates. As the length of battery jars varies, the two smaller plates can be moved inwardly or outwardly away from each other and toward or away from the center of the horizontal mounting plate a distance necessary to correspond to the new length dimension. When properly spaced they are again fixed in placed and the longer sides are bought back into engagement with each of the shorter plates and processing can continue.

Each of these four vertical mounting plates supports a separate heating and clamping assembly. Each of the clamping assemblies are pivotally attached to the mounting plates whereas the heating assemblies are attached so that they can be both pivoted and moved vertically independently of the clamping assembly, the mounting plate and of the welding head itself. The bottom of each of these vertical mounting plates is designed to receive a rail member which will be in a locked condition with the cover's periphery during welding. The heating and clamping areas of the heating and clamping assemblies are positioned beneath the rail member with the clamp bar of the clamp assembly being positioned below the heating bar of the heating assembly so that the heating member lies between the bottom of the rail and the top of the clamp. This arrangement allows the clamps to engage each sidewall of the jar and after the cover is locked to the rail members it can be lifted along the welding head a distance slightly greater than the thickness of the heater bar which can then be pivoted into a position between the cover and the jar.

Battery jars with their elements and covers in place are sequentially loaded onto the deck at the load station and the transfer carriage will sequentially index a jar to the weld station directly beneath the welding head. Prior to the actuation of the transfer carriage assembly, the welding head is moved to its uppermost loading position which allows full clearance for battery jars to be moved thereunder. Once a jar is in place, the welding head is moved down into its operating position. The clamp drive means is actuated to substantially simultaneously bring each of the four clamps into an engagement with one of the sidewalls of the battery jar which finalizes alignment of the sidewalls with the cover. The clamps are attached to and moved with the welding head itself and, accordingly, the clamps remain engaged with the sidewalls throughout the remainder of the welding process. Once the clamps have been engaged the cover will be bought into an engagement against the rails which are located at the lower edges of the vertical mounting plates so that the cover itself will now also be moved together with the welding head and clamps and these will remain integrally locked together until the welding process has been completed. The welding head is slightly raised a distance which is just sufficient to allow the four separate heating members to be placed between the cover and the upper rim of the battery jar but not so great as to remove the cover from within the battery jar so that alignment between the cover and the jar's sidewalls is maintained. The heaters can be raised into an engagement with the cover or positioned to engage the cover and jar at about the same time or to contact the jar first. However, after the heaters are pivoted into position, the welding head together with the heaters are lowered into the heating position where the heater contacts the cover and the jar. After a predetermined melt period during which heating occurs the movement of the weld head is reversed and as the heater blades are withdrawing the weld head is being lowered to bring the two melted areas into an engagement to complete the weld with the rail members applying pressure to the melted joint.

Through such a procedure it is possible to melt the appropriate areas of the battery cover and the battery jar and to bring these melted areas into an engagement extremely quickly and substantially simultaneously with the withdrawal of the heaters so that very little time has been lapsed during which the two melted areas have been exposed to the atmosphere.

Reference is also made to a co-pending application directed to a novel battery cover, U.S. patent application Ser. No. 362,874 filed on Oct. 21, 1980 the substance of which is hereby incorporated by reference. With the use of that cover it is possible during the time period when the two melted areas are being bought into contact with each other to have flow occur in both inwardly and outwardly directions so that very clean and structurally sound joints can be created.

DESCRIPTION OF THE DRAWINGS

A more complete and detailed understanding of the present invention and its objectives may be obtained by the careful study of the following detailed description in combination with the drawings all of which form a part of this invention with the drawings showing:

FIG. 1 is a front elevational view of the preferred exemplary embodiment of the apparatus constructed according to the present invention;

FIG. 2 is an elevational rear view of the preferred embodiment shown in FIG. 1 with parts having been removed for clarity;

FIG. 3 is a side elevational view of the preferred embodiment as shown in FIGS. 1 and 2 with portions having been cut away for clarity;

FIG. 4 is an enlarged plan view of the deck and transfer carriage assemblies;

FIG. 5 is an enlarged front elevational view of the welding head with portions having been omitted or cut away for clarity;

FIG. 5a is a top plan view of the preferred embodiment of the device shown in FIG. 1 with parts having been deleted for clarity;

FIG. 8a is an enlarged front elevational view of the long heating and clamping assemblies;

FIG. 8b is an enlarged front elevational view of the short heating and clamping assemblies;

FIG. 9 is a partial detailed elevational view of the operative end of the cover pickup mechanism;

FIGS. 10a–10h are a series of diagrammatic figures showing the operational sequence of the present invention;

DETAILED DESCRIPTION OF THE PREFERRED EXEMPLARY EMBODIMENT

Figure 7:
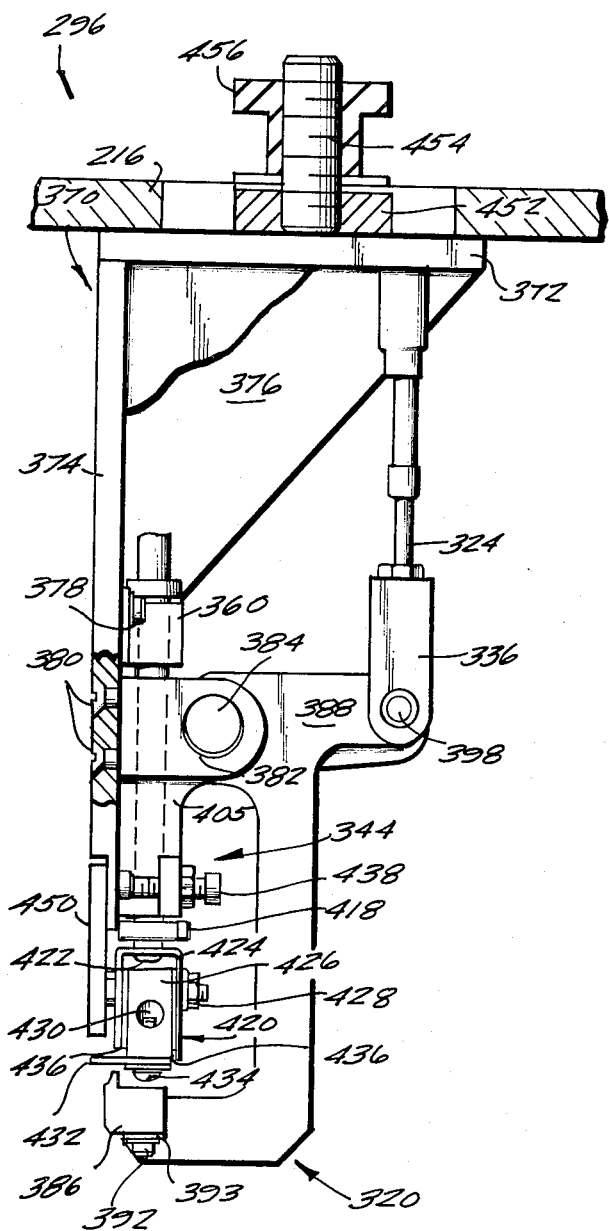
FIG. 7 is an enlarged side elevational view of one of the heating and clamping assemblies.

The overall machine is best shown in FIGS. 1, 2 and 3 and turning to those figures the machine is generally indicated at 10 and is comprised of a number of main assemblies including a main frame assembly 12, a deck assembly 14, a transfer carriage assembly 16, a welding head assembly 18, a hydraulic supply 20, a primary hydraulic manifold 22, a secondary hydraulic manifold 23 and a pneumatic manifold 24.

The frame can be considered as being comprised of front and rear portions, the rear portion being formed from frame elements 26 which form a rectangular base for supporting the hydraulic supply 20. The front frame is comprised of a base portion position including side members 28, a rear member 30 and a front member 32. The rear frame is secured to the rear member 30 of the front frame by any convenient means such as by bolted brackets as shown in FIG. 4 at 33.

The front frame also includes a vertical frame member, generally indicated at 34, comprised of a bottom member 36, two side members 38 and 40, and a top member 42 which together form another rectangular element that can also be bolted to the rear base member 30 and supported by braces 44 and 46 which extend from the upper portion of the vertical frame member 34, respectively, to the rear corners of the side base members 28, as shown in FIGS. 2 and 3, and by a second pair of braces, 48 and 50, which extend from the upper portion of frame member 34 back to frame elements 26 on either side of hydraulic supply 20. Braces 44-50 can be secured between the frame elements in any convenient fashion such as by the use of clevis type mounting brackets as are indicated at 52 throughout the various views.

DECK AND TRANSFER CARRIAGE ASSEMBLIES

The deck and transfer carriage assemblies 14 and 16 respectively, are located at the base of the machine and are supported by base members 28, 30 and 32 and extend across the area beneath the welding head assembly 18.

The deck assembly 14 is comprised of a plate member 60 secured to base members 28-32 by any convenient means such as screws 62. Plate member 60 extends across the entire width of the deck assembly 14 and preferably extends from beneath the transfer carriage assembly 16 to the front edge of front base member 32. Plate 60 is provided with three openings 64, 66, 68 through which roller actuated limit or microswitches 70, 72 and 74 can extend. These limit switches respectively define loading, welding and unloading stations and are aligned with each other along the path of travel of the carriage assembly 16 as will be more fully understood hereafter. Deck assembly 14 also includes a front guide, generally indicated at 76, which is mounted to frame member 32 by means of end plates 78 and 80 which are each attached to frame member 32 by means of brackets and screws as shown in FIG. 4 at 81. Pivotally secured to end plates 78 and 80 are two mounting bars 82 and 84 which together support a pivotal guide bar 86 by means of mounting brackets 88 and 90.

End plates 78 and 80 are each provided with slots 92, as shown in FIG. 3, that curve rearwardly away from the top portion of the end plates for about a 90 degree arc. A securing shaft 94 extends through these slots and is provided with threaded ends. As shown in FIG. 4 a nut 96 is secured to the end extending through end plate 78 while an adjusting handle 98 is threadedly secured to the end of shaft 94 extending through end plate 80. A sleeve 100 overlies shaft 94 in the area between end plates 78 and 80 and also between mounting bars in the area between end plates 82 and 84 so that as handle 98 is turned, mounting bars 82 and 84 will be squeezed and held in position between the ends of sleeve 100 and end plates 78 and 80. When handle 98 is loosened mounting bars 82 and 84 can be adjusted within slots 92 to correctly position guide plate 86 with respect to the front side of battery jars being processed after which the handle can then be turned to lock the position of mounting bars 82 and 84 as adjusted.

It is important that the front face of guide plate 86 be kept perpendicular to plate 60 so that it will lay flat against the sidewalls of battery jars passing thereby. In order to accomplish that, a pair of adjusting levers 102, as shown in FIG. 3, extend from a point directly beneath each of the mounting bars 82 and 84 adjacent the point at which those mounting bars are attached to end plates 78 and 80. The other end of adjusting levers 102 are connected to brackets 88 and 90 adjacent guide plate 86. Thus, as mounting bars 82 and 84 are moved levers 102 cause guide plate 86 to pivot thereby maintaining the perpendicular alignment of the front face of guide bar 86.

With consideration still being given to FIGS. 1-4 the transfer carriage assembly 16 is mounted to frame members 28 by mounting brackets 110 and 112 which respectively support two horizontally extending and vertically spaced apart guide rails 114 and 116 through a pair of brackets 118 for the top rail 114 and a second pair of brackets 120 for the bottom rail 116. Two pairs of linear bearings or pillow blocks 122 and 124 respectively secured to mounting plate 126 slidably support plate 126 to the upper and lower guide shafts 114 and 116. Secured to the front face of mounting plate 126 is an upper guide channel member 128 and lower guide channel member 130 which perhaps are best shown in FIGS. 1 and 4. These are secured to mounting plate 126 by means handles 132 which have threaded bolts extending therefrom for engaging nuts 134 on the rear side of mounting plate 126. In order to allow channel members 128 and 130 to be adjusted horizontally a pair of slots 136 are provided in the mounting plate 126 for top channel member 128 and a second pair of slots 138 are provided in mounting plate 126 for the lower channel member 130. It is through those slots that threaded bolts from handles 132 extend to engage nuts 134. Thus, in order to move channel members 128 and 130 horizontally it is only necessary to loosen handles 132, make the required adjustments and then tighten handle 132 again thereby fixing the channel members in a desired location.

With reference first to the upper channel member 128, the transfer arms 140 and 142 are pivotally attached within channel 128 so they can fold into channel 128 as shown by the arrows in FIG. 4. Arm 140 is actuated by means of a pneumatic cylinder, shown in phantom at 144, which acts on a linkage structure 146 pivotally connected to arm 140. We prefer to have arms 140 and 142 linked together and rather than employing two drive cylinders, a linkage arm 148 is connected from linkage structure 146 across the top of channel bar 128 to a like linkage structure 150 secured to bar 142. A pair of slots 149 are provided in the top of channel member 128 and a suitable pivotal pin connection can serve to connect linkage arm 148 to the linkage structures 146 and 150 of arms 140 and 142, respectively. When cylinder 144 is actuated both bars 140 and 142 are moved simultaneously within the confines of channel member 128. A limit switch 152 is secured within channel member 128 so that it is tripped when arm 140 is in its closed position thereby providing an input signal indicating to the control system, described hereinafter, that arms 140 and 142 are in a closed position.

Turning now to the lower channel member 130 a fixed arm 154 is secured thereto by any convenient means and serves to support guide plate 156 which is adjustable within arm 154 by means of a handle and nut assembly 158 similar to those used to mount channel members 128 and 130. In addition, a slot is provided in arm 154 to allow guide plate 156 to be moved back and forth therein, again in order to accommodate varying sizes of battery jars. When guide plate 156 is in place, as shown in FIG. 3, a battery jar, shown in phantom in FIG. 3, will be held between guide plate 156 and front guide plate 86.

A movable arm 162 is pivotally secured to channel member 130 in a fashion similar to that used for arms 140 and 142 with the movement thereof being controlled by a second pneumatic cylinder 164, as shown in FIG. 1, through a suitable linkage structure 166 so that it is moved in a direction opposite to that of arms 140 and 142 as indicated in FIG. 4. A limit switch 168 is secured to channel 130 so that it will be actuated when arm 162 is closed. When limit switches 168 and 152 are both actuated that will fulfill one of the conditions necessary prior to the controller allowing transfer carriage assembly to move back to the starting position which is shown in FIG. 4. It should be understood that arm 162 is positioned between arms 140 and 142 so that when channel members 128 and 130 are properly adjusted one battery jar will be held between fixed arm 154 and arm 140 while another will be held between arms 162 and 142. Also, during the initial phases of the welding cycle we prefer to leave arms 140 and 154 around the jar that has been moved from the load station to the weld station.

Movement of the carriage transfer assembly is provided by hydraulic cylinder 170 which can be similar to a Parker Hannifin Cat. No. PA5 22 inch stroke hydraulic cylinder manufactured by the Parker Hannifin Corp., Des Plaines, Ill. Cylinder 170 is mounted to bracket 110 and an internal mounting bracket 172 by means of its own mounting brackets 174 and 176, respectively. Drive cylinder 170 is provided with a drive rod 178 connected through coupling 180 to bracket 182 fixed to the rear of plate 126 by any convenient means such as bolts or screws (not shown).

As shown in FIGS. 2 and 4, two limit switches 184 and 186 are provided to respectively indicate when drive rod 178 is in its retracted and extended positions thereby providing inputs to the control system indicating when the transfer assembly is at its load station, as shown in FIG. 4, or in its full stroke position at which time arms 154 and 140 will occupy the position shown for arms 162 and 142 in FIG. 4 whereas arms 162 and 142 become moved so as to overlie limit switch 68 at the unload station. Thus, with one jar in the load station above limit switch 70 and a second jar at the weld station, between arms 142 and 162, actuation of cylinder 170 will move the jars, respectively, from the load to the weld station and from the weld station to the unload station.

WELDING HEAD ASSEMBLY

Overall view of the welding head assembly 18 is shown in FIGS. 1-3 and 5 while additional details of the welding head structure are shown in the FIGS 6-9. Turning first to FIGS. 1 and 3 two vertically mounted guide shafts 200 and 202 are respectively secured to frame members 40 and 38. Welding head assembly 18 is slideably secured to guide shafts 200 and 202 by means of linear bearings or pillow blocks 204 which are in turn directly secured to the welding head assembly 18. In particular, pillow blocks 204 are secured to a welding head frame structure, generally indicated at 206, comprised of two vertical members 208 and 210 between which a support plate 212 and a tie bar 214 extend. Elements 208-214 comprise the rear vertical section of the welding head frame structure and pillow blocks 204 are connected to vertical members 208 and 210. A main horizontal mounting plate 216 is attached along its rear edge to members 208 and 210 and bar 214 with its front and immediate portions being supported by a network of frame members, generally indicated at 218, and including elements 218a-218.

Prior to describing the remaining structure of welding head assembly 18 it is important to understand how the welding assembly is supported and moved.

The primary support for the welding head assembly 18 and the main up/down adjusting mechanism is provided by a hydraulic actuated jack 220 which is a mechanical jack manufactured by the Duff Norton Company, Charlotte, N.C. Model 1802. This jack provides the gross adjustment for the weld head and will be adjusted according to the height of the jars to be processed. It is driven by means of a hydraulic motor 222 such as the Char-Lynn Cat. No. 11-832 mfg. by Eaton Corp. Eden Prairie, Minn. Motor 222 is connected to jack 220 by its drive shaft 224 through suitable couplings 226 and motor 228 is supported to vertical frame member 40 by a mounting bracket 230. Accordingly, it together with the base portion of jack 220 remain fixed in position. Jack screw 232 is operatively connected to a first or lower support plate 234 by means of a mounting bracket 236. Connect to the opposite side of the first or lower support plate 234 and directly opposite jack screw 232 is a hydraulic cylinder 238 whose drive rod 240 is attached by means of a clevis type mounting bracket 242 to second or intermediate mounting plate 244. We have found it preferable to have the stroke of hydraulic cylinder 238 be approximately 4 inches in order to provide sufficient clearance for all forms of terminal posts so that batteries being moved by the carriage assembly 16 across deck plate 60 pass freely beneath welding head assembly 18. Thus, jack screw 232 places the welding head assembly 18 in its exact operating position and the 4 inch stroke of cylinder 238 provides sufficient clearance to raise the welding head assembly 18 out of the path of jars being moved across the deck.

As is clear from FIG. 2, three additional cylinders are mounted to the top side of mounting plate 244 and these cylinders are respectively shown at 246, 248 and 250. The central cylinder 248 provides the primary drive force for moving the welding head assembly 18 during the heating and welding cycle, as will be more fully described hereinafter, and it is secured to an upper mounting plate 252 through its drive shaft 254. Mounting plate 252 is secured to the welding head frame 206, as shown in FIG. 3, by being secured to vertical frame members 208 and 210 by any convenient means such as by welding or bolts (not shown). Thus, when cylinder 248 is actuated the entire welding head assembly 18 will move vertically up and down. In order to correctly position the welding head assembly 18 as it is moved up and down during both the heating and welding phases of the operating cycle, heat stops and weld stops are provided. The heat stops control the "down" position of the weld head assembly 18 during heating and are comprised of hydraulic cylinders 246 and 250 and specifically by their drive shafts which contact opposing adjustable studs 256 and 258 which can have a variable length and can be adjusted within mounting plate 252. The up stop for controlling how high assembly 18 is raised, and the weld stops are provided by threaded shafts 260 and 262 which are each provided with pairs of lock nuts positioned on opposite sides of mounting plate 252. These opposing lock nuts provide positive control over the raised position and also over the lowered position of welding head assembly 18 in those instances when hydraulic cylinder 246 and 250 are deactuated and their drive shafts are retracted.

It should also be pointed out that in order to insure smooth raising and lowering of the weld head assembly 18 by cylinder 238, two guide shafts 264 and 266 are secured to the base of the intermediary mounting plate 244 and extend downwardly through mounting plate 234 within bearings provided in openings in that plate.

As shown in FIG. 2, limit switches 268 and 270 are provided to respectively produce input signals to the control means to indicate the retracted and fully extended conditions of drive rod 240 of cylinder 238. Limit switch 268 is secured to a bracket 272 secured to plate 234 and will abut the bottom of intermediate plate 244 when drive rod 240 is fully retracted. Limit switch 270 is secured to the side of plate 234 and its actuating arm rides against shaft 242 and will move inwardly when drive rod 240 is fully extended and shaft 242 has been raised about flush with the bottom of plate 234.

Two additional limit switches 274 and 276 are provided to indicate the two extreme positions for jack screw 232 of the jack 220 with both being actuated by the plate 234. Limit switch 276 indicates when the jack screw 232 is fully retracted and will prevent further lowering of the weld head assembly 18 whereas limit switch 274 indicates the highest safe position for the jack screw 232 that can be tolerated without having the jack screw becoming disengaged from jack 220.

Turning now to FIGS. 1, 3 and 5, and it can be seen that the operating portion of the welding head assembly 18 is comprised generally of an upper actuating cylinder assembly, generally indicated at 290 which is supported by a top plate 292 an intermediate section containing control shaft mechanisms, generally indicated at 294, located between the top plate 292 and the main horizontal mounting plate 216 and movable, separate heating and clamping assemblies, generally indicated at 296.

The upper actuating cylinder assembly 290 is comprised of nine cylinders which includes an outer group of four pneumatic cylinders 298, 300, 302 and 304, an inner group of four pneumatic cylinders 306, 308, 310 and 312 and a centrally located hydraulic cylinder 314. As is indicated in FIG. 5, each of these cylinders can be secured to top plate 292 by mounting brackets and bolts, generally indicated at 316.

Each of the pneumatic cylinders 298-312 having a spring return and are actuated by valves controlled by solenoids and when so actuated will cause their respective drive rods to be extended through a predetermined stroke. As shown in phantom in FIG. 5, the stroke of cylinders 248-304 can be controlled by stop rods 280 if the stroke of the cylinder is otherwise too long.

Considering first the outer group of four pneumatic cylinders 298-304, the drive rod of each is connected to a control coupling member 318 and serve to control clamp members, generally indicated at 320, by means of a solid drive cable assembly, generally indicated at 322. This drive cable assembly includes a pair of drive shafts 324a and 324b, upper and lower cable connectors 326 and 328, respectively, and outer guide sleeves 330.

Intermediate plate 331 is supported from the upper plate 292 by four short mounting posts 332 whereas four long mounting posts 334 extend between intermediate plate 331 and the main horizontal mounting plate 216. Thus, plate 331 serves as a terminal point for all of the connectors 326 from each of the control cables. The lower end of sleeves 330 and specifically lower cable connectors 238 are mounted to the heater and clamp assemblies 296 so that each of the control shafts can correctly actuate specific portions of the heater and clamp assemblies 296.

With respect to cylinder 298 and the clamp assembly generally indicated at 320, the lower end of shaft 324 is connected by clevis 336 which is pivotally connected to clamp member 320.

The inner group of pneumatic cylinders 306–312 have each of their respective drive rods extending through a control coupling 340 and connected directly to a control shaft 342 which again extends through coupling members similar to those indicated at 326 and 328 and through a sleeve 343 directly to heater assemblies, generally indicated at 344, via a clevis type coupling member 346.

Pneumatic cylinder 314 has its drive rod (not shown) connected to a coupling plate 350 which joins together eight control shafts 352. The eight drive shafts 352 are divided into four parts with each pair going to one of the heater clamp assemblies 296 to control the vertical up and down motion that will subsequently be applied to the heater assemblies 344. It should be kept in mind that the arrangement and mounting of the clamp and heating assemblies 320 and 344, respectively, is designed so that clamp assembly 320 can be pivoted inwardly toward the battery jar and outwardly away therefrom while the heater assemblies 344 cannot only be pivoted toward and away from the battery jars but moved a slight amount in an up and down direction independent of the welding head as well as the clamp assemblies 320. It is this up and down travel of the heater members 344 that is controlled by hydraulic cylinder 314 and shafts 352. As was the case with the control shafts for the pneumatic cylinders 298–312., control shafts 352 are passed through upper and lower coupling members similar to those indicated at 326 and 328 and their own respective sleeves 354 which are similar to those indicated at 330 and 343. The lower end of shafts 352 are connected through a stop plate 356 to a clevis member 358. It should also be pointed out that clevis member 358 operates with bracket 360 against which stop member 356 abuts so that together stop member 356 and bracket 360 provide "down" stop control which limits the extent to which heater assembly 344 can be lowered.

HEATING AND CLAMP ASSEMBLIES

With emphasis still being placed primarily on FIG. 5 reference can also be made to FIGS 6–8b where more of the details of the clamp assemblies 320 and the heating assemblies 344 are shown.

Figure 6:
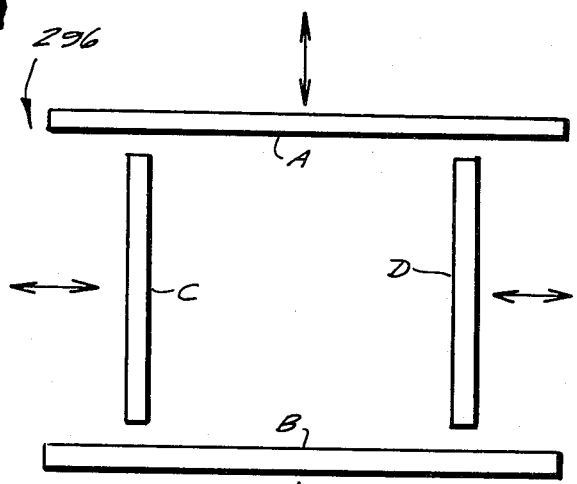
FIG. 6 is a diagrammatic view of the heating and clamping assemblies.

As is diagrammatically shown in FIG. 6 four heating and clamping assemblies 296 are used and are indicated at A, B, C, and D respectively. They are positioned in opposing pairs. Assemblies C and D are short and have a length comparable to the relatively constant width of battery jars which are in a narrow series of either 6.19 or 6.25 inches or a wider series of 8.625 inches. Since the length of batteries can vary anywhere from about 2 inches to about 12 or 14 inches, assemblies A and B are longer and are positioned outside assemblies C and D. Accordingly, assemblies A and B should have lengths equal to or greater than the longest length that will be handled and we have found that a length of 13 to 14 inches should be sufficient for most purposes. Each of the heating and clamping assemblies is, apart from the length differences, constructed substantially identically and an end view of a representative one is shown in FIG. 7 whereas a side elevational view of the longer units A and B as shown in FIG. 8a whereas a representative side elevational view of the shorter units C and D is shown in FIG. 8b. Also, for clarity some elements have been omitted, cut away or included in phantom in these figures. In addition, the reference numerals used in FIG. 8b which relate to common parts which have simply been reduced in size include the letter "a".

Each of the heating and clamping assemblies are mounted to an L-shaped structure generally indicated at 370 comprised of a top horizontal plate 372 and a vertical plate 374. Plate 372 can be welded or screwed directly to vertical plate 374 or alternatively a triangular shaped end piece, indicated at 376, could be used to complete the L-shaped structure 370. As shown in FIG. 7, bracket 360 is secured to vertical plate 374 by screws 378 and likewise, screws 380 can be used to secure two spaced apart end plates 382 to vertical plate 374. End plates 382, as shown in FIG. 8a, for example, are positioned at spaced apart locations and serve to support shaft 384 which is held in place by set screws 385. Clamping assembly 320 and heating assembly 344 are both pivotally attached to shaft 384 as follows. Clamping assembly 320 is comprised of a clamp bar 386 secured to two bell cranks 388 and 390 by screws 392 and bar mounts 393. The inner end of the top horizontal portion of the bell crank is provided with an opening that fits about shaft 384. A collar, respectively indicated at 394, and 396, is welded to each crank arm adjacent to the openings and these are also pivotally retained on shaft 384. The outer end of the top horizontal section of each bell crank, 388 and 390, is pivotally secured through pins 398 to clevis members 336 which are connected to control shafts 324 and the outer cylinders 298-304.

Shaft 384 also supports a one piece crank arm 400 which supports the heater assembly 344. Crank arm 400 is comprised of a sleeve 402 from which a horizontal member 404 extends rearwardly away from plate 374 and is connected by pin 406 to clevis 346 so that the heater assemblies 344 can be pivotally controlled by control shafts 342. As shown in FIG. 5, on the right side where the clamp assembly 320 has been omitted, and in FIGS. 8a and b, an arm 405 and 407 depends from each end of sleeve 402 and each has an opening that fits about shaft 384. Bearing sleeves 408 and 410 are welded or otherwise secured to the inside surface of arms 405 and 407 and each is provided with internal bearings 412. Shafts 414 and 416 are slidably retained within bearing sleeves 408 and 410, respectively, and each is respectively connected to a separate clevis member 358 by pins 415, which are in turn connected to control shafts 352. Connected to the bottom of each of the shafts 414 and 416 is an "up" stop collar 418 and a heating bar, generally indicated at 420, which is connected to the end of shafts 414 and 416 by screws 422. Accordingly, the heating bar 420 can be raised and lowered vertically by the action of shafts 352 as controlled by cylinder 314 with the limitation over its travel in the vertical direction being provided in an upward direction by collars 418 which abut against the bottom of bearing sleeves 408 and 410 and in a downward direction by stop plates 356 which abut against brackets 360.

Heating bar 420 is comprised of an outer housing 424 in which a heater block 426 is retained by bolts 428. A 600 watt 240 volt ⅜ inch Watlow heater, Model Number G5J36, indicated at 430, is retained within block 426 and serves to heat a heating blade 432 fixed to the bottom of block 426 by screws 434. A layer of insulation 436 is provided on each side of block 426 in order to space that block from housing 424 and as can be seen from FIG. 7 heating blade 432 extends inwardly further than the inner face of clamp bar 386.

While the "up" and "down" stops control the vertical motion of heating assembly 344, the pivotal motion is controlled by an "in" stop control in the form of a threaded bolt 438 secured in a mounting bracket 440 connected to arms 405 and 407.

Returning again to FIG. 7 the vertical plate 374 is provided along its lower edge with a rail member 450 which applies pressure to the joint area between the battery cover and jar and is also used to secure the cover to the weld head assembly 18.

As indicated with respect to the diagrammatic showing in FIG. 6, each of the heating and clamping assemblies 296 is slidably secured to mounting plate 216 and is movable toward and away from the center thereof. In order to effect that type of mounting a guide member 452, as shown in FIG. 7, is secured by welding or other convenient means to the top of horizontal plate member 372 and a threaded stud 454 extends upwardly away from guide member 452 and is used with handles 456 to lock each of the assemblies 296 in a fixed position. The horizontal mounting plate 216 is provided with a plurality of slots for each of the four heating and clamping assemblies, these slots being identified generally at 460, 462, 464 and 466 and it is within those pairs of slots that each of the guide members 452 can slide. It should be noted that the long assemblies 296 each have two guide members 452 while the short assemblies have one. The remaining slots in plate 216 are provided to allow the control shaft couplings to move as the assemblies 296 are moved.

In order to adjust the four heating and clamping assemblies 296 for a particular size battery jar and cover combination, the width of the jar in a given series will be a constant factor and equal to the length of members C and D in FIG. 6. The length, however, can change, depending on the number of plates or elements being used, and members C and D would first be set like distances away from the center of plate 216 and locked in place with the distance between them being equal to the length of the series of jars to be processed. Next, the heating and clamping members A and B in FIG. 6 would be moved so that they are in a position directly adjacent the opposite ends of heating and clamping members C and D. Thus, when a jar was properly positioned between members A, B, C and D the clamping bars in each of these members would clamp all four side walls and the heating bars 432 in each of the assemblies would be able to contact the entire periphery between the cover and the jar. It is important to keep in mind, in this regard, that assemblies A, B, C, and D are positioned so that when the heating assemblies are in their closed position the heating bars 436 in assemblies A and B will touch and engage the heating bars of C and D so that when in position during heating the entire periphery of the cover and jar being processed will be heated and melted to the appropriate degree.

Turning now to FIGS. 3 and 9 a cover pick-up assembly, generally indicated at 468, is shown and is driven by a pneumatic cylinder 470 located at the center of plate 216 where it is held in place by means of a threaded ring and sleeve (not shown) to accommodate various vent heights in covers. This cylinder is used to assure firm contact between the cover and rail members 450. The lower portion of this cover pick-up assembly 468 is dimensioned so that it can fit through a centrally located vent opening in battery covers. Cylinder 470 is provided with a drive arm 472 that is connected to a head member 476 by a connecting shaft 483. Head member 476 is also provided with an inverted cone shaped surface 477. This drive unit is slidably held within a split sleeve member, generally indicated at 474, which is comprised of a plurality of resilient arms 478 each of which terminates at a head member 480 which has a portion that extends outwardly beyond arms 478 so as to define a ledge or seat 482.

To facilitate an easy release of the cover and removal of the resilient arms 478 from the cover vent hole a withdrawal guide sleeve 484 is provided within cylinder 470 which extends downwardly to a point just above seats 482. Sleeve 484 has an outer diameter substantially the same as the outer periphery of seats 482 when in their retracted, normal, position so that upon release of the cover, head members 480 will not extend outwardly beyond sleeve 484 and will not, therefore, catch on the cover. Also, guide sleeve 484 and the split sleeve member 474 are secured together so that they can slide together within an outer support sleeve 481 that is secured to cylinder 470.

The upper portion of split sleeve member 474 is formed with a cup shaped seat portion 479 and a spring 485 fits between seat portion 479 and a support surface 486 internally provided at the end of cylinder 470. Spring 485 prevents split sleeve member 474 from being withdrawn into cylinder 470 as drive arm 481 is retracted.

After the depending portion of the drive rod 472 and the split sleeve member 474 are extended downwardly into the vent hole of the cover and the drive rod is pulled back into the cylinder which causes a cone-shaped surface 477 on head member 476 to move against head members 480. Because of the presence of the split resilient arms 478 head members 480 are urged outwardly beyond guide sleeve 484 as well as the periphery of the vent opening, beneath the surface of the cover. As the force of spring 485 is overcome following the expansion of resilient arms 478, further retraction of drive arm 472 moves seats 482 upwardly so that the cover will likewise be raised upwardly toward and into contact with rail members 450. At that point the cover will be locked to the welding head assembly 18 and will move as the weld head assembly 18 is moved. A support lug 487 extends through the sidewall of sleeve 481 and serves to retain the split sleeve member 474 at a predetermined lower position and prevents member 474 from falling out of its position within sleeve 481.

HEATING AND WELDING OPERATION

Turning now to FIGS. 10*a–h* the progression of steps that occur during the heating and welding cycles are shown. The beads resulting from these processing steps have been omitted for the sake of clarity.

FIG. 10*a* represents the status of the cover and battery jar after they have been moved from the load station to the welding station as the welding head assembly 18 is being lowered into position. Clamp bars 386 have already been brought to bear against the side walls of the battery jar and rails 450 are descending toward engagement with the outer periphery of the cover. Guides are provided on the battery cover that engage the interior wall of the battery jar and the pressing action of guide bars 386 assures that opposing side walls of the battery jar are parallel and that adjacent walls are perpendicular so that a proper fit is assured between the cover and the jar side walls.

In FIG. 10*b* rails 450 are in contact with the outer periphery of the cover and it is at this point where the cover pick-up cylinder 470 will be actuated by the control system, described hereinafter, in order to assure the fixed relationship of the cover between that cylinder and rails 450.

Turning next to FIG. 10*c* cylinder 248 has caused the entire welding head 18 to be moved upwardly but it should be noted that the entire cover and particularly the guides that depend therefrom are not removed from their contact with the side wall of the battery jar. This is important because we have found it to be quite helpful to have the parts which are melted brought back together as quickly and as accurately as possible. By not removing the cover structure from the jar, the initial alignment established between the cover and the battery jar, which is aided by the presence of clamp bars 386, is not lost at any time during the heating and welding procedures. The heating blades 432 have been pivoted into position between clamp bars 386 and rails 450 and also in between the top of the battery jar and the bottom of the outer periphery of the cover. The pivoting action of the heater blade 432 has been effected by the inner group of cylinders, they are cylinders 306–312. We have found that it is desirable to separately move the long and short heating bars and this allows the short bars to be pivoted ahead of the long ones when pivoted into position and after the long ones when pivoted out of position. This prevents any possible scraping between the opposed pairs as they are moved.

It is sometimes important to have the heating blade 432 to contact either the cover or the battery jar for a longer length of time, depending upon the type of plastic used, and in FIG. 10*d* the heating blade 432 is shown as having been moved upwardly so that it engages the bottom surface of the cover. This upward movement has been effected by pneumatic cylinder 314 and the upward limitation on the movement of the blade 432 is effected by the "up" stop or collars 418.

Thereafter, turning to FIG. 10*e* the entire welding head can be lowered to the heat stop position defined by heat stop cylinders 246 and 250. In this position, the heating blade 432 is in contact with both the cover and the battery jar and that position can be maintained for a predetermined dwell time as is necessary to effect the required degree of melting to produce an adequate weld. This is controlled by an adjustable timer T1.

After the conclusion of that dwell period, the weld head assembly 18 is again raised by cylinder 248. This disengages the heating blades 432 from the battery jar but as will be recalled from reference to FIG. 10*d* the heating blade had been raised to an "up" position so that it engaged the cover. We have found that it is not desirable to merely pivot the heating blade away from melted surfaces but rather that such disengagement should occur in a vertical direction. Therefore, the heating blades 432 are caused to be lowered again away from the cover in a motion reverse to that used in FIG. 10*d* to bring them into engagement with that cover with the heater blades now being moved downwardly again by cylinder 314. This downward movement can occur simultaneously with the raising of the welding head assembly 18. In this instance, stop plate 356 limits the downward travel of heating blades 432 allowing them to become disengaged from the cover but not to move down so as to re-engage the top surface of the battery jar. This intermediate position for the heating blades 432 is shown in FIG. 10f. Thereafter, the heating blades can be pivoted out of the way and the welding head can again be lowered by the action of cylinder 248 this time to the position of the weld stops defined by rods 260 and 262 and the adjusting nuts thereon. The welding position is shown in FIG. 10g and clearly shows the cover in contact with the side wall of the battery jar. The relationship between pick-up cover cylinder 470 and rails 450 still remains and accordingly weight from the welding head assembly 18 can be brought to bear against the joint through rails 450. If the weight of the welding head is too great some amount of positive pressure can be applied by cylinder 248 so as to assure the correct amount of weight during the welding portion of the cycle. We have found that about 300 pounds ±100 pounds is all that is needed in terms of weight to be applied to rails 450 to effect a proper and high quality seam between the cover and the battery jar.

In FIG. 10h the dwell time for the welding cycle controlled by another adjustable timer $T_2$ has passed, the cover pick-up cylinder 470 has released its grip on the cover and the welding head is being raised away from the now completed weld area by cylinder 238. At the top of the stroke of this cylinder the welding head 18 will be in position to allow the carriage assembly 16 to move another battery jar from the load to the weld station and to remove the finished jar from the weld to the unload station.

As indicated concerning FIG. 10d there may be instances where it is desirable to have the heater blade 432 contact the cover and the jar for the same amount of time or for that matter to have the heater contact the top of the jar for a longer period. If it is desired to heat the cover and jar surfaces for approximately equal periods of time the heater assembly 344 can be allowed to float following its inward pivoting by cylinders 298–304 so that rather than being either raised or lowered it could be moved downward along with the welding head assembly 18 so that it comes into contact with both the cover and the jar at approximately the same time. Since the heater bars are at their lowest position relative to the cover when they are pivoted inwardly to the position as shown in FIG. 10c the removal of drive pressure from cylinder 314 allows the welding head assembly 18 to correctly position the heater blades 432 as shown in FIG. 10e.

If it was desired to have the heating blade 432 contact the surface of the jar for a longer period of time following its being pivoted into the position shown in FIG. 10c driving force from cylinder 314 can be left to maintain the lowest position for the heating blades 432 and thereafter the welding head can be lowered. In this instance, the heating blades will contact the jar prior to the full descending stroke of the weld head assembly 18 which will bring the cover into contact with the upper surface of the heating blades.

In each of these operating modes the withdrawal sequence of the heating blades 432 is the same as that initially described. Further, as indicated previously it is most desirable to withdraw the heating blade from the thermoplastic surfaces in a vertical or perpendicular direction rather than having the heating blades slide either between the two now melted thermoplastic members prior to raising the cover away from the battery jar or across either melted surface in a horizontal fashion prior to moving the heating blade out of contact therewith.

With respect to FIG. 10g it should be understood that this position can be held by timer $T_2$ for a period of time ranging from about 15 to about 25 seconds during which the weld area can cool down and set. This time period allows the thermoplastic material to resolidify at the joint and also provides time for the melted area to regain strength prior to being released. While beads formed during the heating and welding steps have been omitted, it should be understood that beads will form on the outside of the joint between the cover and the jar and as an optional step, clamp bars 386 could be raised vertically off of the jar and cover assembly prior to their being pivoted out of contact therewith so as to spread the still soft beads into a flat layer.

CONTROL SYSTEM

The operation of this apparatus is effected by both pneumatic and hydraulic systems. The pneumatic system is supplied with a source of compressed air (not shown) which is filtered through a filter and regulator assembly made by the Parker Company, Oswego, Mich. with the air being then supplied to the pneumatic manifold 24. This pneumatic manifold is actuated by solenoids under the control of a Model 5 Texas Instruments Programmable Control System which includes a programmer, sequencer, and input/output boards which provide the necessary control logic interface between the operating solenoids of the pneumatic and hydraulic systems and the limit switches employed throughout the apparatus.

The hydraulic supply 20 is supplied by the Pneumatic and Hydraulic Distributors, Inc. of Marlboro, Mass., Ser. No. 71935 and includes a hydraulic reservoir 492 and a drive motor 494. This drive motor can be a three phase motor such as Model Number M80031 made by the Baldor Electric Company, Fort Smith, Ark. The hydraulic system also includes a radiator 496 so that the hydraulic fluid returning to the reservoir returns via the radiator and is cooled prior to being reused. Output from the reservoir flows to the hydraulic cylinders as regulated by a primary hydraulic manifold 22 and a second hydraulic manifold 23 both of which are actuated by solenoids under the control of the 5 TI control system. The primary hydraulic manifold 22 includes four directional control valves with one serving to control the up and down motion of the heating assemblies and specifically the actuation of cylinder 314, a second controls the melt stop cylinders 246 and 250, a third controls the primary short stroke cylinder 248 used during the heating and welding steps and a fourth controls the clearance cylinder 238. The secondary pneumatic manifold 23 serves to control the operation of motor 222 which drives jack 220 and also the main carriage drive cylinder 170.

The pneumatic manifold 24 also includes a plurality of solenoid actuated valves which respectively control the cover pickup cylinder 470, the simultaneous actuation of carriage arm cylinders 144 and 164 the actuation of clamp cylinders 298–304 and two additional valves each controlling opposing pairs of the heater assemblies one controlling the long assemblies shown in FIG. 8a and specifically cylinders 306 and 310 and another valve for controlling the short heater assemblies shown in FIG. 8b specifically cylinders 308 and 312. As indicated previously, it is desirable to have the short heater assemblies actuated and pivoted into position first followed by the longer assemblies so that no sliding engagement occurs. The delay between the actuation of these two groups is only momentary but is sufficient to bring the short assemblies into position first.

A number of limit switches have been already identified previously in the specification but additional limit switches are employed for each of the cylinders at the top of the welding head, namely 298-314, and the limit switches are respectively identified as 500-516. These limit switches can be either actuated by the cylinders drive rods as those move or actuating arms can extend through the top mounting plate 292 so that they can contact, for example, couplings 318. In any event, it is only necessary that these limit switches be able to produce an input signal when the heating and clamping assemblies are pivoted out of their operating position.

Figure 11:
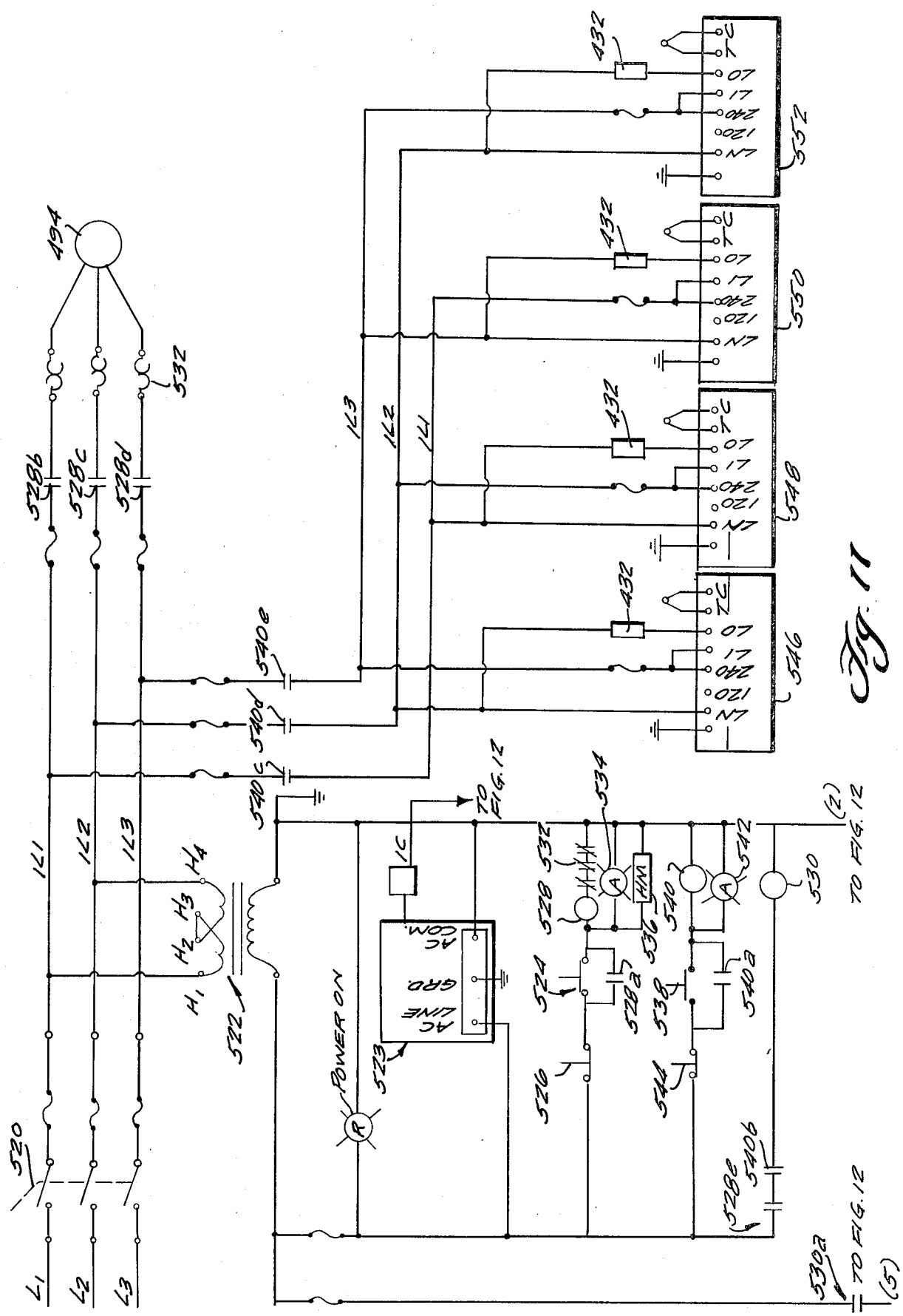
FIG. 11 shows a portion of the control circuit used to control the sequential operation of the present invention.
Figure 12:
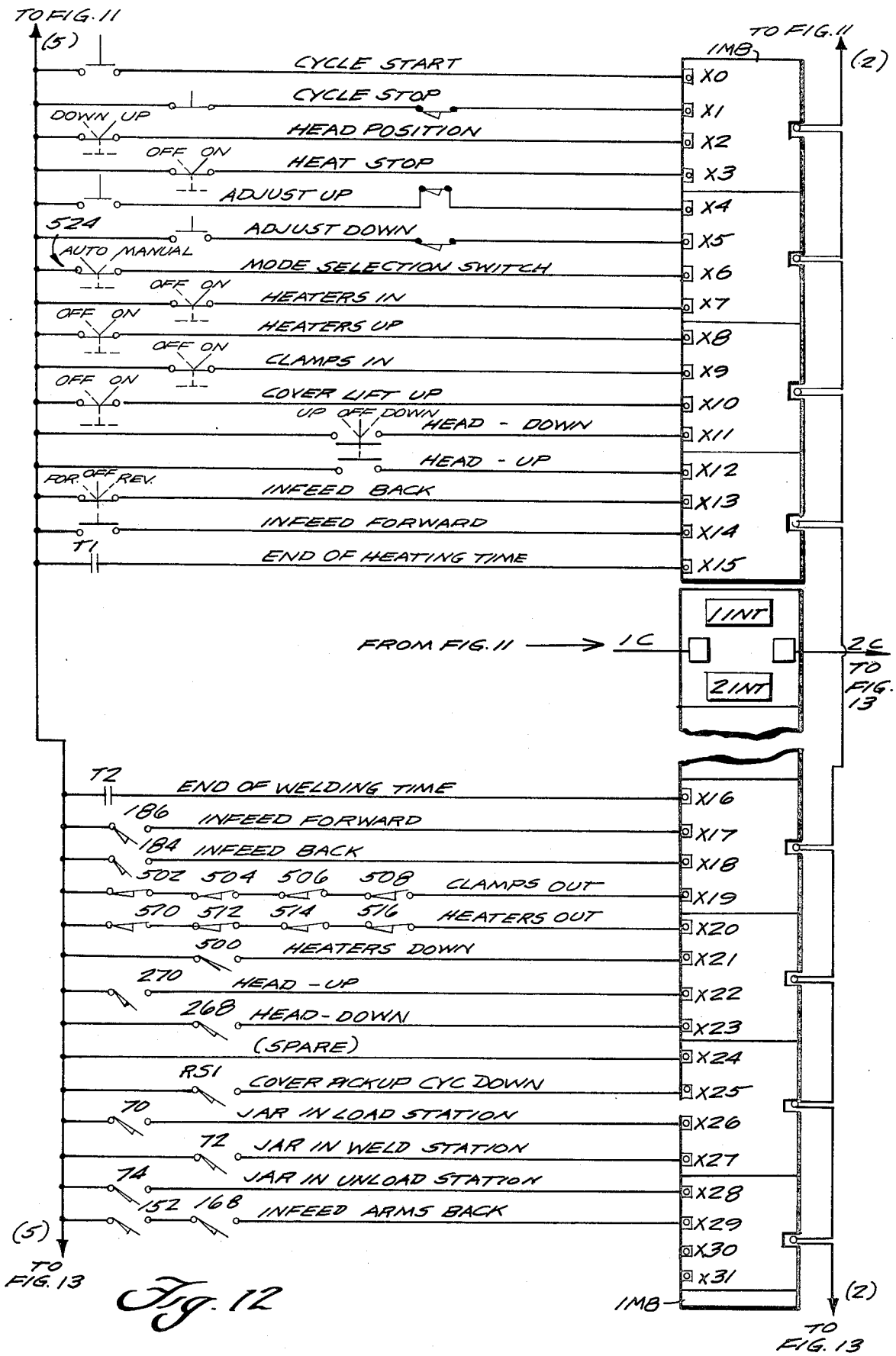
FIG. 12 shows the input board connections used in the control system.
Figure 13:
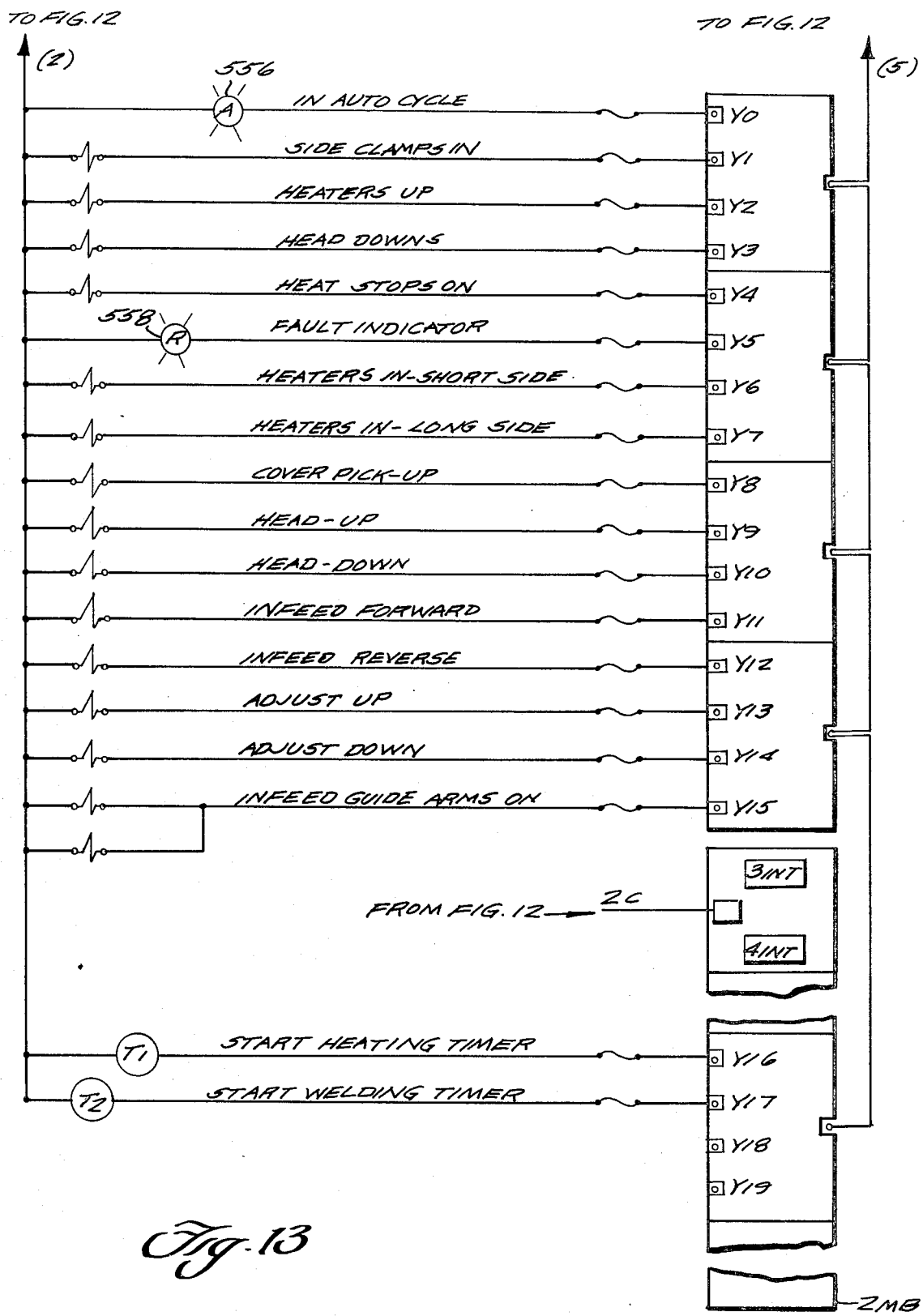
FIG. 13 shows the output board connections used in the control system.

Turning now to FIGS. 11-13 the circuit diagrams of the control system for this invention are set forth. Turning first to FIG. 11 we see the main control circuit, the main power supply and the temperature controllers for heater blades. In FIG. 12 the input board for the controller is shown and in FIG. 13 the output board from the controller. FIG. 12 also includes the manual override circuit that allows manual operation of the devices.

Turning now to FIG. 11 lines 1, 2 and 3 are connected to a power supply of 240 volt, 3 phase 60 or any other suitable power Hertz which is connected by means of a main power switch 520. Lines 1L1-1L3 each contain a 20 amp fuse and a transformer 522 is connected across lines 1L1 and 1L2 to provide the appropriate control voltage for the 5 TI controller and this portion of the circuit including the input and output boards. 3-Phase current is also supplied to the hydraulic supply motor 494. Control of that motor is provided by start switch 524 and stop switch 526. Start switch 524 is a momentary switch and actuates relay 528 which closes contacts 528a thereby providing a holding circuit around switch 524 to keep the motor running. Likewise, additional contacts 528b, c and d as well as an auxiliary contact 528e are also actuated with the latter serving as part of the switch controlling the master control relay 530. Master control relay 530 has a single contact 530a which will provide power to the input and output boards shown in FIGS. 12 and 13 once the motor is running and once the heaters have been turned on as will be explained hereafter. Overload protection for motor 494 is provided by overload switches and their contacts 532 which are in series with relay 528.

When start switch 524 is actuated it also serves to turn on an amber light 534 and start an hour meter 536.

The heaters are turned on in a similar fashion by a main "on" switch 538 thereby actuating a relay 540 which closes contacts 540a and 540b. Contacts 540a serves as a holding circuit around momentary switch 538 whereas contacts 540b complete the circuit to the master control relay 530 so that power is supplied to the input and output boards of the controller thru contact 530a Switch 540a also serves to energize light 542 to indicate that the heaters are on. In addition, a heater stop switch 544 is also provided to turn the heaters off. The heater relay 540 additionally has contacts 540c, d and e which serve to connect lines 1L1-1L3 to the four temperature controllers indicated at 546, 548, 550 and 552. Thus, each of the heater bars 532 and the heating assemblies 344 has its temperature separately controllable and each of these temperature controllers 546-552 will be set for a specific temperature which will be controlled by the internal thermocouple indicated by contacts TC. In each of these temperature controller terminals 240 and L1 are tied together so that power is supplied, for example, in temperature controller 546, via lines L3 and L2 with power coming in line L2 via terminal LN and across the 600 watt heater 432 via terminal L0 with the connection being completed back to line L3 via terminals L1 and 240 which corresponds to the 240 volt power supply.

Control of this system can be automatic, via the controller or manual via the manual overrides. The input signals for the controller provided by the bottom half of the circuit shown in FIG. 12 will be generated when the listed condition occurs as the switches are tripped closed. All of the switches are normally open except for those in positions X19 and X20 which signal the condition when the heater and clamp assemblies are pivoted outwardly away from contact with the jar and cover. These switches are normally closed switches. The outputs to control the solenoids and the respective pneumatic hydraulic manifolds are controlled according to the circuit set forth in FIG. 13. The positions X0-X15 which are on the input board in FIG. 12 set forth manual override switches for manually operating the welding apparatus through its various cycles. Control between automatic sequencing and manual sequencing is provided by the mode selection switch 524.

Turning first to the inputs on the lower portions of FIG. 12 the first position at X15 corresponds to the signal generated at the end of the dwell time for heating which is provided by an adjustable timer T1 shown in FIG. 13. At the next position X16 is the output from time T2 which indicates the end of the welding time dwell period and this again is an adjustable time that can be varied to control the amount of time the apparatus is held in the position shown in FIG. 10g. At the next positions X17 and X18, limit switches 186 and 184, respectively indicate, the position of the carriage assembly in its forward or back position and comparable outputs to cylinder 170 are provided by the solenoids at positions Y11 and Y12 on the output board shown in FIG. 13.

At the next position on the input board X19 in FIG. 12 there are four limit switches 502-508 which indicate the position of cylinders 298-304. As indicated previously, these switches are normally closed and when the cylinders 298-304 are actuated by an output from position Y1 on FIG. 13 switches 502-508 will be open. When the clamps are again pivoted out of position, switches 502-508 will be closed thereby generating an input signal at X19 indicating the clamps have been, in fact, pivoted away from the jar.

At the next position, X20, a similar set of limit switches 510-516 are employed for the heaters but as shown in FIG. 13 control over the actuation of the heater groups the cylinders 306-312 into two pairs as indicated at output positions Y6 and Y7. Heaters on the short side, specifically controlled by cylinders 306 and 310, are grouped together and the heaters on the long side, controlled by cylinders 308 and 312, are grouped together. When the heaters have been pivoted "in" to their operating position the normally closed switches 510-516 will be open and when the heaters are out away from the jar, switches 510-516 will be closed.

Movement of the heaters up and down is controlled by hydraulic cylinder 314 with output coming from position Y2 on FIG. 13 and when the heaters are moved down, limit switch 500 will be tripped closed to generate an input signal at position X21.

Turning to the next two input positions X22 and X23 they respectively refer to inputs from the use of the clearance cylinder 238. This is a dual position cylinder and as is indicated from that output board at positions Y9 and Y10 two separate solenoids are used to provide the desired up and down control. Limit switches 268 and 270 respectively indicate when the welding head is "down" or "up" and as was indicated previously the head would move down at the beginning of the cycle and will be raised at the end of the cycle merely to allow clearance beneath the welding head for outgoing and incoming jars and their covers. In between these two periods cylinder 238 is not actuated.

The cover pickup cylinder 470 is provided with one internal reed switch indicated on FIG. 12 at RS1 to indicate when the pickup cylinder is in its "down" position at which point the cover has been released. Pickup cylinder is controlled by an output signal from the Y8 position on FIG. 13 and will be controlled by its own separate solenoid located within the pneumatic manifold 24.

The next three positions on the input controller X26–X28 relate to the limit switches 70, 72 and 74 on deck 60 for respectively indicating that battery jars are either in the load station, the weld station or the unload station. We have found it is desirable to not permit the transfer carriage assembly 16 to return to its initial position immediately after having fed a new battery jar to the weld station and removed a finished welding jar to the unload station. Also, return is not permitted unless the arms have been folded back to their "in" positions nor until the unload station has been cleared of a battery jar. Other arrangements could, however, be built into the system if a different mode of operation was desired.

Finally at position X29 two limit switches 152 and 168 are used to indicate to the controller when the arms on the carriage are back in their "in" position.

Returning once again to the output board in FIG. 13 the Y0 position will produce an output signal to turn on light 556 indicating the controller is in its automatic cycle sequence. Positions Y1 and Y2 have already been described. Position Y3 relates to the outputs to the solenoid controlling cylinder 248 which is the main cylinder controlling the actuation of the welding head assembly 18 during the heating and welding cycles. Likewise, the next position at Y4 relates to the output for the solenoid controlling the actuation of the heat stop cylinders 246 and 250 that control the downward movement of the welding head assembly 18 by cylinder 248 during the heating cycle. The output at position Y5 generates an indication of a fault and serves to light a red lamp 558 to indicate that condition. Such a fault condition will occur if the height of the jar is outside the acceptable range for any particular sequence of jars. In that instance, the welding heating sequence would be held up. At positions Y11 and Y12 outputs are provided for solenoids controlling the movement of the transfer carriage assembly 16 and in particular actuation of hydraulic cylinder 170. At output positions Y13 and Y14 outputs are provided for the solenoids that control hydraulic motor 222 in control of the jack assembly 220. At output position Y15 an output signal is produced to control the actuation of cylinders 144 and 164.

As an exemplary program Attachment A is provided which sets forth a program listing for a typical program controlling the operation of the welding apparatus including the communication of the data, the control and operation of relays or solenoids and the appropriate control of contacts. This program listing would be used with the 5TI 2000 programmer in order to establish the control welder that the sequence will operate under.

While the invention has been described in connection with what is presently conceived to be the most practical and preferred embodiment, it is to be understood the invention is not limited to the disclosed embodiment, but on the contrary, it is intended to cover various other modifications and equivalent arrangements included within the spirit and scope of the appended claims, which scope is to be, of course, the broadest interpretation so as to encompass all such equivalent structures and methods.

| 5TI PROGRAM LISTING HARDIGG #1 COVER WELDER E-106 | |
|---|---|
| Address | Contents |
| 0 | STR-NOT X28 |
| 1 | AND X18 |
| 2 | AND X6 |
| 3 | AND X0 |
| 4 | OUT CR0 |
| 5 | STR X18 |
| 6 | AND Y0 |
| 7 | OR CR0 |
| 8 | AND X1 |
| 9 | AND X6 |
| 10 | OUT Y0 |
| 11 | STR CR1 |
| 12 | OR Y0 |
| 13 | AND-NOT CR100 |
| 14 | AND X1 |
| 15 | OUT CR1 |
| 16 | STR X16 |
| 17 | AND CR15 |
| 18 | STR CR101 |
| 19 | AND CR15 |
| 20 | AND X12 |
| 21 | OR STR |
| 22 | OR NOT X1 |
| 23 | OR CR100 |
| 24 | AND-NOT Y10 |
| 25 | OUT Y9 |
| 26 | STR-NOT CR1 |
| 27 | AND-NOT X6 |
| 28 | OUT CR101 |
| 29 | STR X28 |
| 30 | OR NOT X17 |
| 31 | AND CR1 |
| 32 | AND Y15 |
| 33 | STR CR101 |
| 34 | AND X14 |
| 35 | OR STR |
| 36 | OR X18 |
| 37 | OUT Y15 |
| 38 | STR-NOT X28 |
| 39 | AND X18 |
| 40 | STR-NOT Y12 |
| 41 | AND Y11 |
| 42 | OR STR |
| 43 | AND CR1 |
| 44 | STR Y11 |
| 45 | OR NOT X28 |
| 46 | AND CR101 |
| 47 | AND X14 |
| 48 | OR STR |
| 49 | AND X22 |
| 50 | OUT Y11 |
| 51 | STR CR101 |
| 52 | AND X13 |
| 53 | OR Y16 |
| 54 | STR X29 |
| 55 | OR X18 |
| 56 | AND STR |
| 57 | AND-NOT X26 |
| 58 | AND-NOT Y11 |
| 59 | OUT Y12 |
| 60 | STR X17 |
| 61 | STR X17 |
| 62 | TMR |

5TI PROGRAM LISTING
HARDIGG #1 COVER WELDER E-106

| Address | Contents |
|---|---|
| 63 | 10 |
| 64 | 10 |
| 65 | OUT CR16 |
| 66 | STR X20 |
| 67 | AND-NOT Y6 |
| 68 | AND X25 |
| 69 | AND-NOT Y8 |
| 70 | OUT CR2 |
| 71 | AND X19 |
| 72 | AND-NOT Y1 |
| 73 | OUT CR15 |
| 74 | STR CR15 |
| 75 | AND CR16 |
| 76 | STR Y10 |
| 77 | AND-NOT X16 |
| 78 | OR STR |
| 79 | AND CR1 |
| 80 | STR CR101 |
| 81 | AND X11 |
| 82 | AND CR15 |
| 83 | OR STR |
| 84 | OUT Y10 |
| 85 | STR Y17 |
| 86 | STR Y17 |
| 87 | TMR |
| 88 | 50 |
| 89 | 50 |
| 90 | OUT CR14 |
| 91 | STR Y10 |
| 92 | AND X23 |
| 93 | STR Y1 |
| 94 | AND-NOT X16 |
| 95 | OR STR |
| 96 | AND CR1 |
| 97 | STR CR101 |
| 98 | AND X9 |
| 99 | OR STR |
| 100 | AND X27 |
| 101 | AND X1 |
| 102 | OUT Y1 |
| 103 | STR Y1 |
| 104 | STR Y1 |
| 105 | TMR |
| 106 | 5 |
| 107 | 5 |
| 108 | OUT CR3 |
| 109 | TMR |
| 110 | 5 |
| 111 | 5 |
| 112 | OUT CR4 |
| 113 | STR CR1 |
| 114 | AND CR4 |
| 115 | AND-NOT CR14 |
| 116 | AND-NOT X16 |
| 117 | STR CR101 |
| 118 | AND X10 |
| 119 | OR STR |
| 120 | AND X1 |
| 121 | OUT Y8 |
| 122 | STR CR3 |
| 123 | AND X25 |
| 124 | AND-NOT X15 |
| 125 | STR Y17 |
| 126 | AND X20 |
| 127 | OR STR |
| 128 | OR CR8 |
| 129 | AND CR1 |
| 130 | STR CR101 |
| 131 | AND X2 |
| 132 | OR STR |
| 133 | OUT Y3 |
| 134 | STR CR1 |
| 135 | AND-NOT X25 |
| 136 | AND-NOT Y17 |
| 137 | STR CR101 |
| 138 | AND X3 |
| 139 | OR STR |
| 140 | OUT Y4 |

5TI PROGRAM LISTING
HARDIGG #1 COVER WELDER E-106

| Address | Contents |
|---|---|
| 141 | STR-NOT X25 |
| 142 | STR CR1 |
| 143 | AND-NOT X25 |
| 144 | TMR |
| 145 | 10 |
| 146 | 10 |
| 147 | OUT CR6 |
| 148 | STR CR13 |
| 149 | STR CR13 |
| 150 | TMR |
| 151 | 4 |
| 152 | 4 |
| 153 | OUT CR7 |
| 154 | STR CR1 |
| 155 | AND CR6 |
| 156 | STR CR101 |
| 157 | AND-NOT X7 |
| 158 | OR STR |
| 159 | OUT CR13 |
| 160 | STR CR6 |
| 161 | AND-NOT Y17 |
| 162 | STR CR101 |
| 163 | AND-NOT X7 |
| 164 | OR STR |
| 165 | AND X1 |
| 166 | OUT Y6 |
| 167 | STR CR7 |
| 168 | AND Y6 |
| 169 | OUT Y7 |
| 170 | STR Y7 |
| 171 | STR CR1 |
| 172 | TMR |
| 173 | 4 |
| 174 | 4 |
| 175 | OUT Y16 |
| 176 | STR Y16 |
| 177 | STR-NOT X15 |
| 178 | TMR |
| 179 | 5 |
| 180 | 5 |
| 181 | OUT CR8 |
| 182 | STR X15 |
| 183 | STR CR1 |
| 184 | TMR |
| 185 | 10 |
| 186 | 10 |
| 187 | OUT CR9 |
| 188 | TMR |
| 189 | 10 |
| 190 | 10 |
| 191 | OUT Y17 |
| 192 | STR CR1 |
| 193 | AND Y16 |
| 194 | AND-NOT CR9 |
| 195 | STR CR101 |
| 196 | AND X8 |
| 197 | OR STR |
| 198 | AND X1 |
| 199 | OUT Y2 |
| 200 | STR X16 |
| 201 | AND X22 |
| 202 | STR-NOT CR1 |
| 203 | AND CR0 |
| 204 | OR STR |
| 205 | OUT CR99 |
| 206 | STR-NOT CR99 |
| 207 | STR-NOT CR99 |
| 208 | TMR |
| 209 | 5 |
| 210 | 5 |
| 211 | OUT-NOT CR100 |
| 212 | STR CR101 |
| 213 | AND X4 |
| 214 | AND-NOT X5 |
| 215 | OUT Y13 |
| 216 | STR CR101 |
| 217 | AND X5 |
| 218 | AND-NOT X4 |

| 5TI PROGRAM LISTING |  |
|---|---|
| HARDIGG #1 COVER WELDER E-106 | |
| Address | Contents |
| 219 | OUT Y14 |

What is claimed is:

1. Welding apparatus comprised of a frame means for defining a work zone having at least a welding station, welding means movably secured to said frame above said welding station for clamping and welding structures together, said welding means including a mounting plate, a plurality of separate heating and clamping assemblies, each adjustably secured to said mounting plate so as to be movable toward and away from the center of said mounting plate; drive means for driving said welding means; and control means for actuating said drive means and establishing a predetermined sequence of operation for said welding means.

2. Welding apparatus for welding plastic covers onto plastic containers comprising: a main frame for supporting the apparatus, means defining a work zone having loading, welding and unload stations; means for moving containers successively from said loading station to said welding station and following welding to said unload station, welding means positioned above said welding station for controlling the relationship between said cover and container during welding and for forming a welded joint, said welding means including a welding frame slidably mounted to said main frame so as to be vertically movable thereon between predetermined positions, a plurality of mounting plates movably attached to said welding frame so as to be horizontally movable thereon, each of said mounting plates having a heating assembly attached thereto so as to be vertically and pivotally movable thereon and a separate clamping assembly pivotally attached thereto, drive means for operating said apparatus, and control means for actuating said drive means in a predetermined sequence.

3. A device for welding plastic covers onto plastic containers comprising: frame means for supporting the device, transport carriage means for receiving containers and for sequentially moving containers between load, weld and unload stations, welding head means for establishing and controlling the relationship between the cover and container prior to and during welding and for welding the cover to the container, said welding head means including a plurality of individually mounted heating and clamping assemblies for defining the sides forming the periphery of said welding head means and for operating along each side of the cover and container being welded together, first drive means for driving said transport carriage means, second drive means for driving said welding head means, and control means for controlling the operation of said first and second drive means.

4. A device as in claim 3 wherein said heating assemblies are mounted to said welding head means so as to be pivotally and vertically movable and said clamping assemblies are mounted to said welding head means so as to be pivotally movable.

5. A device as in claim 3 or 4 wherein the welding head means includes a welding head frame having a primary horizontal mounting plate, each of said heating and clamping assemblies being adjustably secured to said horizontal mounting plate so as to be positioned adjacent one another in a manner that they extend around the periphery of the cover and container being welded together.

6. A device as in claim 5 wherein each of said separate heating and clamping assemblies include a mounting structure movably secured to said horizontal mounting plate, heater means for heating the joint area between the cover and container, said heater means being mounted to said mounting structure so as to be movable toward and away from the joint area and vertically with respect to the joint area, and rail means for engaging the periphery of the top of the cover.

7. A device as in claim 3 or 4 wherein said separate heating and clamping assemblies are arranged in two opposing pairs with each separate assembly in each pair being positioned parallel to one another with the pairs being perpendicular to one another.

8. A device as in claim 7 wherein one of said opposing pairs lies within the area defined between the other one of said two opposing pairs.

9. An apparatus for welding plastic covers onto plastic containers comprising a frame, welding head means slidably secured to said frame so as to be movable vertically between a plurality of predetermined positions for gripping the cover and the container and effecting a welded joint therebetween, first drive means for driving said welding head means, deck means defining a weld station directly beneath said welding head means as well as separate load and unload stations spaced from and located on opposite sides of the weld station, said welding head means including separate heating and clamping assemblies adjustably mounted to said welding head means so as to be positioned adjacent each side of the container for heating and welding said cover onto said container, transfer carriage means slidably mounted to said frame for moving the containers between said load, weld and unload stations, second drive means for moving said transfer carriage means, third drive means for moving each of said separate heating and welding means into and out of an operating position adjacent said container, and control means for automatically controlling the operation of said apparatus.

10. An apparatus as in claim 9 wherein said separate heating and clamping assemblies are arranged in two opposing pairs with each separate assembly in each pair being positioned parallel to one another with the pairs being perpendicular to one another.

11. An apparatus as in claim 10 wherein one of said opposing pairs lies within the area defined between the other one of said two opposing pairs.

12. An apparatus as in claim 10 wherein the length of one of said pairs is shorter than the length of the other pair.

13. An apparatus as in claim 12 wherein the longer pair of heating and clamping assemblies have a length of about 14 inches.

14. An apparatus as in claim 10 wherein one opposed pair of said separate heating and clamping assembly has a first predetermined length and the other opposed pair has a second predetermined length.

15. An apparatus as in claim 9 wherein each of said separate heating and welding assemblies include a mounting plate adjustably secured to said welding head means, a heating member pivotally secured to said mounting plate and a clamping device pivotaly attached to said mounting plate with said heating and clamping members being independently movable.

16. An apparatus as in claim 15 wherein said heating member is also vertically movable independently of said pivotal movement and of said welding head means.

17. An apparatus as in claim 9 wherein heating and clamping assemblies include a mounting plate and heating means for melting the joint area, said heating means being mounted to said mounting plate so as to be both pivotally and vertically movable thereon.

18. An apparatus as in any of claims 9, 10, 14 or 15 wherein each of said separate heating and clamping assemblies include rail means for engaging the periphery of the cover and wherein said welding head means further includes means for gripping the cover and securing the cover into engagement with said rail means.

19. An apparatus as in claim 9 wherein said deck means includes guide means for guiding containers along a predetermined path as they are moved by said transfer carriage means.

20. An apparatus as in claim 9 wherein said transfer carriage means includes a guide means for positioning the containers at a predetermined position in said load station.

21. A method of welding plastic covers onto plastic containers comprising the steps of:
   receiving a container on which a cover has been positioned at a load station and moving the container to a downstream weld station,
   lowering a welding head comprised of four separate heating and clamping assemblies over the upper portion of the container so that one of the separate heating and clamping assemblies becomes positioned adjacent each side of the container,
   securing the cover to the welding head,
   clamping the sides of the container,
   raising the cover a predetermined distance to create a gap between the welding surfaces on the cover and container,
   inserting a heating element into the gap created between the cover and the container along each side of the container, so that the element heating one side is in contact with the element heating the two adjacent sides and bringing the heating element into contact with both the cover and container,
   heating the periphery of the cover and container adjacent the heating element for a first predetermined period of time,
   removing the heating element from each side and clamping the heated areas of the cover and container together for a second predetermined period of time.

22. A method as in claim 21 wherein the step of inserting a heating element includes the step of engaging each heating element with the elements heating the two adjacent sides.

23. A method as in claim 21 wherein the step of inserting the heating element includes the additional step of raising each heating element into engagement with the cover prior to effecting engagement between the heating element and the container.

24. A method as in claim 21 wherein the step of raising the cover includes the additional step of maintaining alignment between the cover and the container as the cover is moved.

25. A method as in claim 21 wherein the step of bringing the heating element into contact with the cover and the container includes the steps of lowering the cover and independently controlling the vertical position of the heating element with respect to both the cover and the container as the cover is lowered.

26. A method as in claim 21 wherein the first predetermined period of time ranges from about 5 to about 35 seconds.

27. A method as in claim 21 wherein the second predetermined period of time ranges from about 15 to about 30 seconds.

28. A method as in claim 21 wherein the cover is provided with an opening and the step of securing the cover includes the steps of inserting an expandable retainer into the opening in the cover, expanding the retainer so that it extends beyond the periphery of the opening and raising the cover toward the welding head and into engagement therewith.

29. Welding apparatus comprised of a frame means for defining a work zone having at least one welding station, welding means for clamping and welding structures and being together movably secured to said frame above said welding station so as to be vertically movable into and out of said welding station, said welding means further including a mounting plate, a plurality of individually movable heating and clamping assemblies, each of said plurality of heating and clamping assemblies being adjustably secured to said mounting plate so as to be movable toward and away from structures positioned at said welding station, drive means for driving said welding means; and control means for actuating said drive means and establishing a predetermined sequence of operation for said welding means.

30. Welding apparatus for welding plastic covers onto plastic containers positioned at a welding station within said welding apparatus comprising: a main frame for supporting the apparatus, means defining a work zone having loading, welding, and unload stations; means for moving containers successively from said loading station to said welding station and following welding to said unload station, welding means positioned above said welding station for controlling the relationship between said cover and container during welding and for forming a welded joint, said welding means including a welding frame slidably mounted to said main frame so as to be vertically movable thereon between predetermined positions, means defining a plurality of movably mounted independently controllable heating and clamping assemblies so as to be at least horizontally movable on said welding frame, each of said heating assemblies being vertically and pivotally movable and each of said clamping assemblies being pivotally movable, drive means for operating said apparatus, and control means for actuating said drive means in a predetermined sequence.

* * * * *